US008620627B2

(12) United States Patent
Nakhle et al.

(10) Patent No.: US 8,620,627 B2
(45) Date of Patent: Dec. 31, 2013

(54) COMPOSITE INFORMATION DISPLAY FOR A PART

(75) Inventors: Joelle Nakhle, Montreal (CA); Thanh Van Huynh Ba, Montreal (CA); Michael T. Clare, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 1037 days.

(21) Appl. No.: 12/578,314

(22) Filed: Oct. 13, 2009

(65) Prior Publication Data

US 2011/0087463 A1  Apr. 14, 2011

(51) Int. Cl.
G06F 17/50 (2006.01)

(52) U.S. Cl.
USPC .......................................................... 703/1

(58) Field of Classification Search
USPC ............................................................ 703/1
See application file for complete search history.

(56) References Cited

U.S. PATENT DOCUMENTS

| | | |
|---|---|---|
| 3,711,934 A | 1/1973 | Zorowski et al. |
| 4,072,516 A | 2/1978 | Pepper et al. |
| 4,229,473 A | 10/1980 | Elber |
| 4,334,124 A | 6/1982 | Imsand et al. |
| 4,498,139 A | 2/1985 | Malinovsky |
| 4,666,546 A | 5/1987 | Treber |
| 4,849,913 A | 7/1989 | Ward et al. |
| 4,907,164 A | 3/1990 | Guyder |
| 5,006,990 A | 4/1991 | Ward et al. |
| 5,031,457 A | 7/1991 | Kline |
| 5,038,291 A | 8/1991 | Wang et al. |
| 5,119,309 A | 6/1992 | Cavendish et al. |
| 5,216,612 A | 6/1993 | Cornett et al. |
| 5,452,407 A | 9/1995 | Crook |
| 5,500,272 A | 3/1996 | Padden |
| 5,984,511 A | 11/1999 | Vasey-Glandon et al. |

(Continued)

FOREIGN PATENT DOCUMENTS

| | | |
|---|---|---|
| EP | 1050396 A1 | 11/2000 |
| EP | 1296103 A2 | 3/2003 |

(Continued)

OTHER PUBLICATIONS

In-Ho Song et al., "Synthesis of the digital mock-up system for heterogeneous CAD assembly," available online Nov. 2, 2008, Computers in Industry, vol. 60, pp. 285-295.*

(Continued)

Primary Examiner — Kamini S Shah
Assistant Examiner — Russ Guill
(74) Attorney, Agent, or Firm — Yee & Associates, P.C.

(57) ABSTRACT

A method and apparatus for processing a model of a part. A number of locations are identified in the model of the part in response to receiving a request from a client application for information about the number of locations on the part. A section cut is created at each of the number of locations to form a number of section cuts. Data is obtained for layers in each of the number of section cuts. The model with the number of section cuts is changed to form a formatted model with a format used by the client application. The layers in each of the number of section cuts in the formatted model are associated with the data for the number of layers in the each of the number of section cuts. The formatted model and the data for the layers is returned to the client application.

19 Claims, 16 Drawing Sheets

(56) References Cited

U.S. PATENT DOCUMENTS

| | | | |
|---|---|---|---|
| 6,030,483 A | 2/2000 | Wilson | |
| 6,041,132 A | 3/2000 | Isaacs et al. | |
| 6,052,631 A | 4/2000 | Busch et al. | |
| 6,138,056 A | 10/2000 | Hardesty et al. | |
| 6,253,218 B1 | 6/2001 | Aoki et al. | |
| 6,278,457 B1 | 8/2001 | Bernardini et al. | |
| 6,341,261 B1 | 1/2002 | Vasey-Glandon et al. | |
| 6,356,437 B1 | 3/2002 | Mitchell et al. | |
| 6,407,738 B1 | 6/2002 | Wakabayashi | |
| 6,442,611 B1* | 8/2002 | Navarre et al. | 709/227 |
| 6,445,390 B1 | 9/2002 | Aftosmis et al. | |
| 6,484,776 B1 | 11/2002 | Meilunas et al. | |
| 6,502,489 B2 | 1/2003 | Gerent et al. | |
| 6,625,618 B1 | 9/2003 | Arai | |
| 6,629,302 B2 | 9/2003 | Miura et al. | |
| 6,690,159 B2 | 2/2004 | Burreson et al. | |
| 6,799,081 B1 | 9/2004 | Hale et al. | |
| 6,819,966 B1 | 11/2004 | Haeberli | |
| 6,843,565 B2 | 1/2005 | Evans et al. | |
| 6,879,872 B2 | 4/2005 | Fukumura | |
| 6,959,235 B1 | 10/2005 | Abdel-Malek et al. | |
| 7,006,087 B2 | 2/2006 | Takagi | |
| 7,010,472 B1 | 3/2006 | Vasey-Glandon et al. | |
| 7,058,472 B2 | 6/2006 | Mathews et al. | |
| 7,076,323 B2 | 7/2006 | Vanderwiel | |
| 7,079,996 B2 | 7/2006 | Stewart et al. | |
| 7,099,725 B2 | 8/2006 | Murrish et al. | |
| 7,159,112 B1 | 1/2007 | Williams | |
| 7,171,344 B2 | 1/2007 | Lind | |
| 7,243,055 B2 | 7/2007 | Chen et al. | |
| 7,244,230 B2 | 7/2007 | Duggirala et al. | |
| 7,300,693 B2 | 11/2007 | Albers et al. | |
| 7,324,103 B2 | 1/2008 | Stewart et al. | |
| 7,365,747 B2 | 4/2008 | Finlayson et al. | |
| 7,366,643 B2 | 4/2008 | Verdura et al. | |
| 7,376,480 B2 | 5/2008 | Hagen et al. | |
| 7,407,556 B2 | 8/2008 | Oldani et al. | |
| 7,423,523 B2 | 9/2008 | Green | |
| 7,424,543 B2 | 9/2008 | Rice, III | |
| 7,513,965 B2 | 4/2009 | Oldani et al. | |
| 7,526,418 B2 | 4/2009 | Pita et al. | |
| 7,545,274 B2 | 6/2009 | Coop | |
| 7,555,404 B2 | 6/2009 | Brennan et al. | |
| 7,561,996 B2 | 7/2009 | Lu et al. | |
| 7,617,029 B2 | 11/2009 | Loda | |
| 7,651,756 B2 | 1/2010 | Albers et al. | |
| 7,720,561 B2 | 5/2010 | Tang et al. | |
| 7,747,421 B2 | 6/2010 | Tang et al. | |
| 7,751,917 B2 | 7/2010 | Rees et al. | |
| 7,761,183 B2 | 7/2010 | Sullivan | |
| 7,761,713 B2 | 7/2010 | Baar | |
| 7,769,481 B2 | 8/2010 | Tang et al. | |
| 7,809,454 B2 | 10/2010 | Hu et al. | |
| 7,809,531 B2 | 10/2010 | Murrish | |
| 7,809,679 B2 | 10/2010 | Nixon et al. | |
| 7,810,025 B2 | 10/2010 | Blair et al. | |
| 7,823,062 B2 | 10/2010 | Liberty et al. | |
| 7,869,982 B2 | 1/2011 | Drumheller et al. | |
| 7,875,333 B2 | 1/2011 | Stephan | |
| 7,912,602 B2 | 3/2011 | Sells et al. | |
| 7,983,809 B2 | 7/2011 | Kell et al. | |
| 8,103,101 B2 | 1/2012 | Fujiwara et al. | |
| 8,108,058 B2 | 1/2012 | Murrish et al. | |
| 8,165,703 B2 | 4/2012 | Burgos Gallego et al. | |
| 8,209,838 B2 | 7/2012 | Lindgren | |
| 8,285,407 B2 | 10/2012 | Kessel et al. | |
| 2001/0045148 A1 | 11/2001 | Gerent et al. | |
| 2001/0047251 A1* | 11/2001 | Kemp | 703/1 |
| 2001/0047508 A1 | 11/2001 | Miura et al. | |
| 2002/0026385 A1* | 2/2002 | McCloskey et al. | 705/27 |
| 2002/0077752 A1 | 6/2002 | Burreson et al. | |
| 2002/0077968 A1 | 6/2002 | Kaniwa et al. | |
| 2002/0174010 A1 | 11/2002 | Rice, III | |
| 2002/0183986 A1 | 12/2002 | Stewart et al. | |
| 2003/0055812 A1 | 3/2003 | Williams et al. | |
| 2003/0080957 A1 | 5/2003 | Stewart et al. | |
| 2003/0120472 A1 | 6/2003 | Lind | |
| 2003/0145017 A1 | 7/2003 | Patton et al. | |
| 2003/0191554 A1 | 10/2003 | Russell et al. | |
| 2004/0021828 A1 | 2/2004 | Evans et al. | |
| 2004/0024661 A1 | 2/2004 | Freel et al. | |
| 2004/0139330 A1 | 7/2004 | Baar | |
| 2004/0147840 A1 | 7/2004 | Duggirala et al. | |
| 2004/0177060 A1 | 9/2004 | Nixon et al. | |
| 2004/0236561 A1 | 11/2004 | Smith et al. | |
| 2005/0055181 A1 | 3/2005 | Verdura et al. | |
| 2005/0119774 A1 | 6/2005 | Murrish et al. | |
| 2005/0240291 A1 | 10/2005 | Oldani et al. | |
| 2005/0241261 A1 | 11/2005 | Martinez-Cepeda | |
| 2005/0247396 A1 | 11/2005 | Oldani et al. | |
| 2006/0015777 A1 | 1/2006 | Loda | |
| 2006/0041518 A1* | 2/2006 | Blair et al. | 705/80 |
| 2006/0041840 A1 | 2/2006 | Blair et al. | |
| 2006/0066609 A1* | 3/2006 | Iodice et al. | 345/419 |
| 2006/0119601 A1 | 6/2006 | Finlayson et al. | |
| 2006/0265198 A1 | 11/2006 | Kanai et al. | |
| 2006/0291724 A1 | 12/2006 | Fujiwara et al. | |
| 2007/0073429 A1 | 3/2007 | Rees et al. | |
| 2007/0106418 A1 | 5/2007 | Hagen et al. | |
| 2007/0150087 A1 | 6/2007 | Tang et al. | |
| 2007/0191982 A1 | 8/2007 | Sullivan | |
| 2007/0236354 A1 | 10/2007 | Green | |
| 2007/0241908 A1 | 10/2007 | Coop | |
| 2007/0244590 A1 | 10/2007 | Menayo et al. | |
| 2007/0300204 A1* | 12/2007 | Andreev et al. | 717/104 |
| 2008/0312764 A1 | 12/2008 | Murrish | |
| 2009/0005928 A1 | 1/2009 | Sells et al. | |
| 2009/0043533 A1 | 2/2009 | Brennan et al. | |
| 2009/0076638 A1 | 3/2009 | Hu et al. | |
| 2009/0112540 A1 | 4/2009 | Kessel et al. | |
| 2009/0112820 A1 | 4/2009 | Kessel et al. | |
| 2009/0112973 A1 | 4/2009 | Kessel et al. | |
| 2009/0138139 A1 | 5/2009 | Tsai et al. | |
| 2010/0042283 A1 | 2/2010 | Kell et al. | |
| 2010/0161095 A1 | 6/2010 | Lindgren | |
| 2010/0170985 A1 | 7/2010 | Flood | |
| 2011/0082681 A1 | 4/2011 | Teramae et al. | |
| 2012/0045606 A1 | 2/2012 | Griess et al. | |
| 2012/0049000 A1 | 3/2012 | Kajita et al. | |

FOREIGN PATENT DOCUMENTS

| | | |
|---|---|---|
| EP | 1503301 A2 | 2/2005 |
| EP | 1840775 A | 10/2007 |
| JP | 2000298734 | 10/2000 |
| JP | 2004264993 A | 9/2004 |
| JP | 2006350499 A | 12/2006 |
| WO | WO0056541 A1 | 9/2000 |
| WO | 2009055201 A | 4/2009 |
| WO | WO2009070410 | 6/2009 |
| WO | WO2010019328 A1 | 2/2010 |
| WO | WO2011046686 A1 | 4/2011 |
| WO | WO2012024023 A1 | 2/2012 |

OTHER PUBLICATIONS

USPTO office action for U.S. Appl. No. 11/924,107 dated Sep. 1, 2010.

USPTO Final office action for U.S. Appl. No. 11/924,107 dated Dec. 27, 2010.

PCT search report for application PCT/US2010/047886 date Jan. 25, 2011.

Ding et al., "XML-based Representations in Product Lifecycle Management", 11th international Conference on Computer Supported Cooperative Work in Design, 2007, IEEE, Apr. 1, 2007 pp. 762-767.

Guillermin et al., "Advanced CAD Software Tools for Cost Effective Composite Engineering", International SAMPE Symposium and Exhibition, vol. 2, May 6, 2001, pp. 1699-1910.

Prakash et al., "Computer Graphics in the Design and Manufacture of Composite Laminate Components", Computers and Graphics, Elsevier, GB, vol. 17 No. 4, Jul. 1, 1993, pp. 407-413.

(56) References Cited

OTHER PUBLICATIONS

Li et al., "Research on the Collaborative Virtual Products Development Based on Web and X3D", IEEE 6th International Conference on Artificial Reality and Telexistence—workshops, 2006, ICAT'06, Nov. 1, 2006, pp. 141-144.
USPTO office action for U.S. Appl. No. 12/192,168 dated Apr. 5, 2011.
Amendment pursuant to request for continued examination dated Mar. 17, 2011 regarding U.S. Appl. No. 11/924,107, 25 Pages.
USPTO non-final office action dated Dec. 27, 2010 regarding U.S. Appl. No. 11/924,107, 21 Pages.
USPTO Non-final office action dated Dec. 7, 2011 regarding U.S. Appl. No. 11/924,107, 32 Pages.
Response to office action dated Nov. 17, 2010 regarding U.S. Appl. No. 11/924,107, 16 Pages.
Response to office action dated Mar. 7, 2012 regarding U.S. Appl. No. 11/924,107, 17 Pages.
Appeal Brief dated Jan. 30, 2012 regarding U.S. Appl. No. 12/192,162, 35 Pages.
USPTO final office action dated Nov. 9, 2011 regarding U.S. Appl. No. 12/192,162, 14 Pages.
USPTO non-final office action dated Jul. 20, 2011 regarding U.S. Appl. No. 12/192,162, 29 Pages.
USPTO notice of allowance dated Feb. 17, 2012 regarding U.S. Appl. No. 12/192,162, 9 Pages.
Response to office action dated Oct. 20, 2011 regarding U.S. Appl. No. 12/192,162, 16 Pages.
Amendment pursuant to request for continued examination dated Dec. 30, 2011 regarding U.S. Appl. No. 12/192,168, 17 Pages.
USPTO final office action dated Sep. 30, 2011 regarding U.S. Appl. No. 12/192,168, 13 Pages.
Response to office action dated Jun. 29, 2011 regarding U.S. Appl. No. 12/192,168, 16 Pages.
USPTO Notice of Allowance, dated May 21, 2012, regarding U.S. Appl. No. 12/192,162, 14 pages.
International Search Report and Written Opinion of the International Searching Authority, dated Mar. 5, 2009, regarding Application No. PCT/US2008/081793, 14 pages.
International Search Report and Written Opinion of the International Searching Authority, dated Aug. 5, 2011, regarding Application No. PCT/US2011/041519, 10 pages.
Cera et al., "Role-based viewing envelopes for information protection in collaborative modeling," Computer-Aided Design, col. 36, No. 9, Aug. 2004, pp. 873-886.
Fink et al., "Hybrid CFRP/titanium bolted joints: Performance assessment and application to a spacecraft payload adaptor," Composites Science and Technology, Feb. 2010, vol. 70, Issue 2, pp. 305-317.
Griess et al., "Multi-Layer Metallic Structure and Composite-to-Metal Joint Methods," USPTO U.S. Appl. No. 13/443,687, filed Apr. 2012, 55 pages.
Kolesnikov et al., "CFRP/titanium hybrid materials for improving composite bolted joints," Composites Structures, Jun. 2008, vol. 83, No. 4, pp. 368-380.
Office Action, dated Apr. 29, 2011, regarding USPTO U.S. Appl. No. 11/945,121, 16 pages.
Final Office Action, dated Oct. 28, 2011, regarding USPTO U.S. Appl. No. 11/945,121, 15 pages.
Notice of Allowance, dated Jul. 20, 2012, regarding USPTO U.S. Appl. No. 11/924,107, 18 pages.
Office Action, dated Aug. 3, 2012, regarding USPTO U.S. Appl. No. 12/192,168, 27 pages.
Kanga, "Application of Intelligent Computer-Aided Design techniques to Power Plant Design and Operation", IEEE Transactions on Energy Conversion, NJ, vol. EC-2, No. 4, Dec. 1, 1987, pp. 592-597.
PCT Search & Written Opinion for PCT/US2009/049931 dated Oct. 15, 2009.
PCT International Search Report for application PCT/US2008/076095 dated Jun. 8, 2009.
Prakash, "Autolay—a GUI-based design and development software for laminated composite components", Computers and Graphics, Elsevier, GB, vol. 23, No. 1, Feb. 1999, 1 page.
Griess et al., "Composite Structures Having Composite-To-Metal Joints and Method for Making the Same," USPTO U.S. Appl. No. 13/716,171 and Preliminary Amendment, filed Dec. 16, 2012, 39 pages.
Notice of Allowance, dated Jan. 15, 2013, regarding USPTO U.S. Appl. No. 12/192,168, 19 pages.
Office Action, dated Nov. 13, 2012 regarding USPTO U.S. Appl. No. 12/857,835, 14 pages.
Partial European Search Report, dated Aug. 1, 2013, regarding Application No. EP13162774.7, 6 pages.

* cited by examiner

FIG. 3
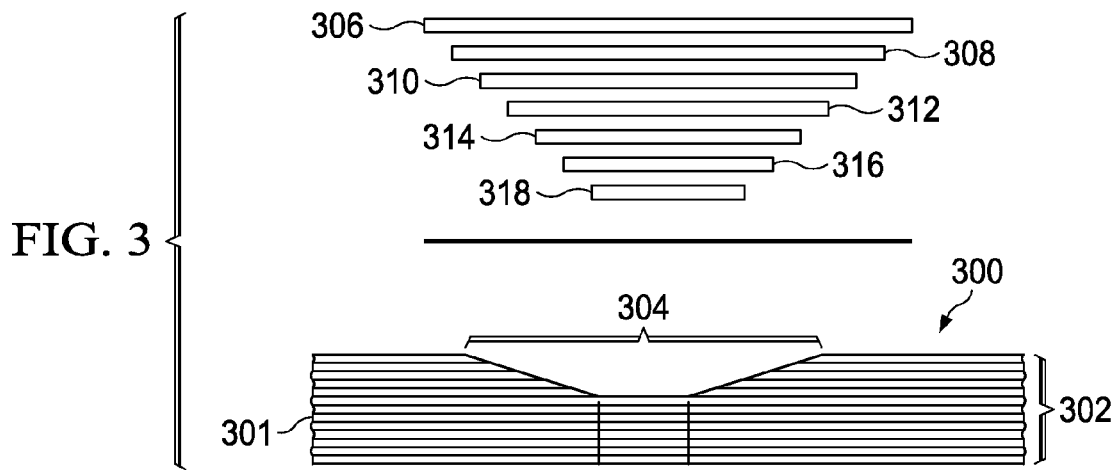
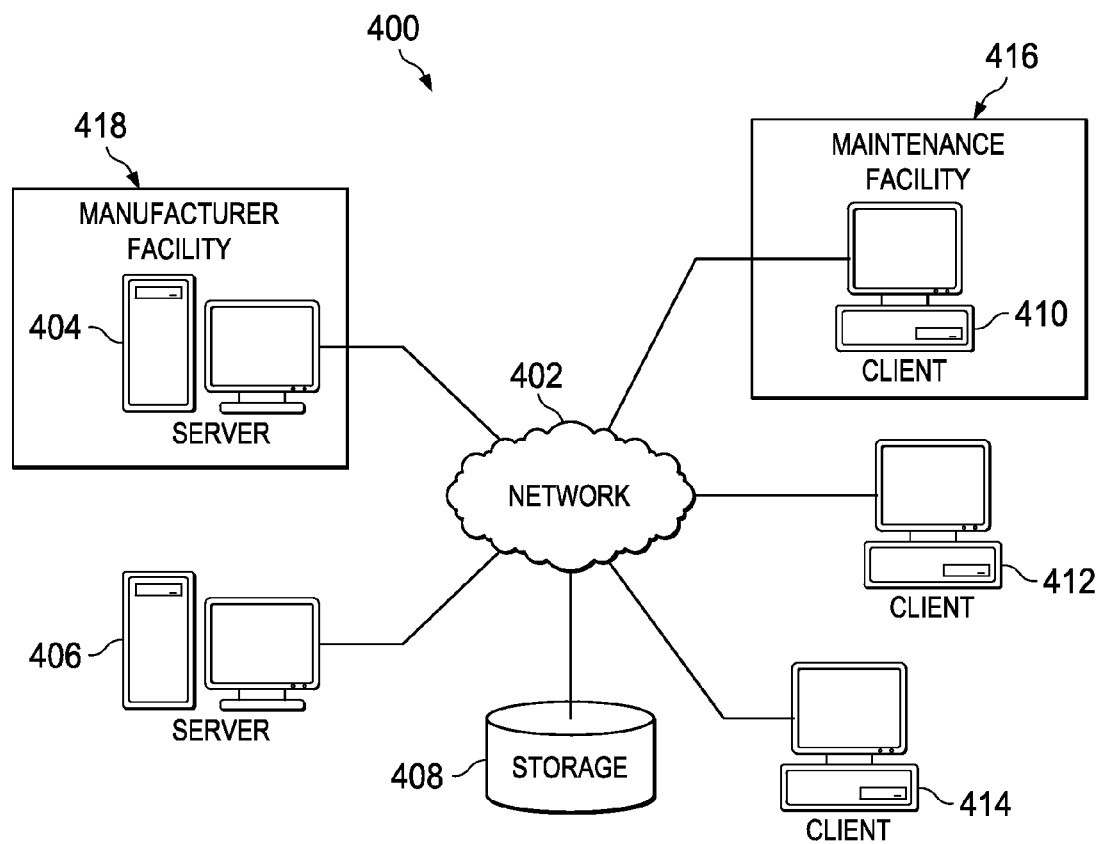
FIG. 4

COMPOSITE INFORMATION DISPLAY FOR A PART

BACKGROUND INFORMATION

1. Field

The present disclosure relates generally to composite parts and, in particular, to a method and apparatus for obtaining information about composite parts. Still more particularly, the present disclosure relates to a method and apparatus for obtaining information about plies in a layup of plies for a composite part.

2. Background

Aircraft are being designed and manufactured with ever increasing percentages of composite materials. Some aircraft may have more than 50 percent of its primary structure made from composite materials. Composite materials are used in aircraft to decrease the weight of the aircraft. This decreased weight improves performance features, such as payload capacities and fuel efficiencies. Further, composite materials provide longer service life for various parts in an aircraft.

Composite materials are strong, light-weight materials, created by combining two or more dissimilar components. For example, a composite may include fibers and resins. The fibers and resins are combined and cured to form a composite material.

Further, by using composite materials, parts of an aircraft may be created in larger sections with fewer pieces, eliminating many fasteners. For example, the fuselage of an aircraft may be created in cylindrical sections with integral stringers. Another example is a stabilizer of an aircraft which may be created as a single piece incorporating spars and upper and lower skins with integral stiffeners.

Rework of composite parts may be needed when inconsistencies are present in the composite parts. When performing rework on composite parts for aircraft, ply layup data, such as an identification of the number of plies, orientation of each ply, the location of each ply within the composite part, the ply material, and the cured part thickness, is needed to replace the material to be reworked.

In some instances, two-dimensional drawings may be present in a manual. Details of composite parts in these drawings include ply layup and part thickness data. This information includes an identification of each ply, the orientation of the ply, the location of the ply in the layup, the ply material, as well as thickness information for the part itself. This type of data is typically used to perform rework on composite parts. These drawings may be hard to find or difficult to interpret. Also, the drawings may not convey information about the layers of plies. As a result, maintenance, such as reworking a part, may take more time and have increased costs.

Therefore, it would be advantageous to have a method and apparatus that takes into account at least some of the issues discussed above, as well as possibly other issues.

SUMMARY

In one advantageous embodiment, a method is present for processing a model of a part. A number of locations are identified in the model of the part in response to receiving a request from a client application for information about the number of locations on the part. A section cut is created at each of the number of locations in the model of the part to form a number of section cuts. Data is obtained for a number of layers in each of the number of section cuts. The model with the number of section cuts is changed to form a formatted model with a format used by the client application to display the formatted model. The number of layers in the each of the number of section cuts in the formatted model is associated with the data for the number of layers in each of the number of section cuts to form an association between the formatted model and the data. The formatted model and the data for the number of layers are returned in a response to the client application.

In another advantageous embodiment, an apparatus comprises a bus, a memory connected to the bus, program code stored in the memory, and a processor unit configured to run the program code. The processor unit runs the program code to identify a number of locations in a model of a part in response to receiving a request from a client application for information about the number of locations on the part. The processor unit runs the program code to create a section cut at each of the number of locations in the model of the part to form a number of section cuts. The processor unit runs the program code to obtain data for a number of layers in each of the number of section cuts. The processor unit runs the program code to change the model with the number of section cuts to form a formatted model with a format used by the client application to display the formatted model. The processor unit runs the program code to associate the number of layers in each of the number of section cuts in the formatted model with the data for the number of layers in each of the number of section cuts to form an association between the formatted model and the data. The processor unit also runs the program code to return the formatted model and the data for the number of layers in a response to the client application.

In yet another advantageous embodiment, a computer program product is present for processing a model of a part. The computer program product comprises a computer recordable storage medium and program code stored on the computer recordable storage medium. Program code is present to identify a number of locations in the model of the part in response to receiving a request from a client application for information about the number of locations on the part. Program code is present to create a section cut at each of the number of locations in the model of the part to form a number of section cuts. Program code is present to obtain data for a number of layers in each of the number of section cuts. Program code is also present to change the model with the number of section cuts to form a formatted model with a format used by the client application to display the formatted model. Program code is present to associate the number of layers in each of the number of section cuts in the formatted model with the data for the number of layers in each of the number of section cuts to form an association between the formatted model and the data. Program code is present to return the formatted model and the data for the number of layers in a response to the client application.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 3 is an illustration of a cross section of a portion of an aircraft in accordance with an advantageous embodiment;

FIG. 4 is an illustration of a network of data processing systems in which advantageous embodiments may be implemented;

DETAILED DESCRIPTION

Figure 1:
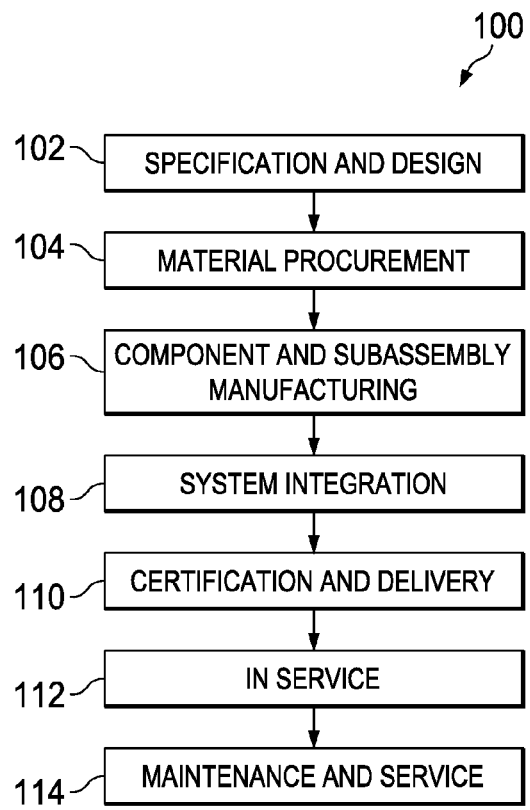
FIG. 1 is an illustration of an aircraft manufacturing and service method in accordance with an advantageous embodiment.
Figure 2:
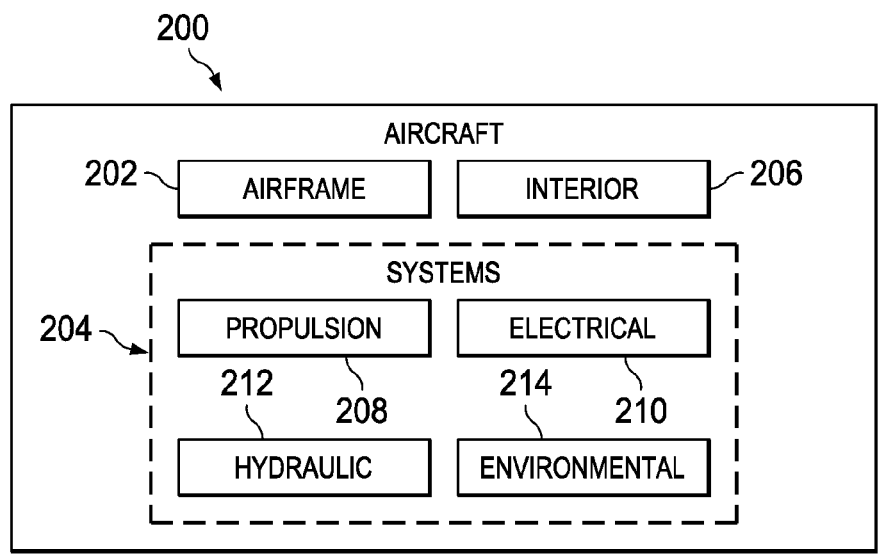
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be reworked using one or more advantageous embodiments fabricated or manufactured in a manner similar to components or subassemblies produced while aircraft 200 is in service 112 in FIG. 1. As another example, more specifically, the different advantageous embodiments may be used during maintenance and service 114 in FIG. 1 to provide information about layers in a composite part for use during maintenance operations. These operations may be for repair or modification of composite parts.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

In one advantageous embodiment, in response to receiving a request from a client application for information about a location on the part, the location is identified in a model of the part. A number of sections is created for a number of layers at the location of the model in the part. Data is obtained for the number of layers. The number of sections created in the model is formatted into a format for a view supported by the client application to form a formatted model. The data is formatted for the number of layers into a format supported by the client application. The formatted model and data are returned in response to the client application.

As a result, the client application is capable of viewing the layers in the part at the selected location, as well as obtaining data about the information.

Turning to FIG. 3, an illustration of a cross section of a portion of an aircraft is depicted in accordance with an advantageous embodiment. In this example, part 300 is a composite part having layers 301 in the form of plies 302. Part 300 may be, for example, without limitation, a portion of a fuselage, a wing, a stabilizer, or some other portion of an aircraft.

In this particular example, an inconsistency is present in section 304. Plies 302 may have different orientations and may include different materials in this particular example. To perform maintenance and/or rework on section 304 of part 300, knowledge of the ply layup data may be needed to properly repair part 300. Ply layup data is data describing the plies within part 300. Ply layup data may include, for example, without limitation, stacking sequences, orientation, and/or materials for plies 302. This type of data may be found within three-dimensional models containing the composite part or in a separate database.

In this particular example, plies 306, 308, 310, 312, 314, 316, and 318 are used to perform a rework of section 304. These different plies are selected to have the same sequence, orientation, and materials to match up to plies within plies 302 in this illustrative example.

The different advantageous embodiments recognize and take into account a number of different considerations. For example, the different illustrative embodiments recognize and take into account that although two-dimensional drawings may be used to perform maintenance on composite parts, these types of drawings may be more difficult to interpret or use. For example, two-dimensional drawings may not convey information as needed about a particular part. The different illustrative embodiments recognize that one potential solution is to extract the ply layup data from the three-dimensional models themselves. These three-dimensional models are engineering data sets that may be managed by a computer-aided design program.

The different illustrative embodiments also recognize and take into account that one potential solution to this problem is that the data for the composite parts may be extracted from the three-dimensional models by the manufacturer or suppliers in advance for every composite part, or on demand during fleet support of the aircraft.

These types of solutions, however, have been recognized by the advantageous embodiments to be cost prohibitive in many cases, depending on the quantity of the composite parts for a particular aircraft. Further, providing this information on demand may not comply with service level agreements between the aircraft manufacturer and customers.

The different advantageous embodiments recognize and take into account that another potential solution is to provide the three-dimensional models to the customers. This potential solution is recognized by the different illustrative embodiments also as being undesirable in many cases, because of the requirements for the customers. For example, in order to view the models, customers would require access or use of computer-aided design programs or viewers for those programs. These types of programs and viewers may have a cost that is unattractive to customers. Also, in addition to the cost for the additional software needed to extract the information, the customers also would need to have users that are trained to use the programs to locate the composite layup data for particular locations in the aircraft.

The different advantageous embodiments recognize and take into account that the three-dimensional models or information in the three-dimensional models may be trade secret information. This data may include specification and performance information about the aircraft. Other trade secret information in these models includes, for example, without limitation, architectural and structural information for the different parts of the aircraft, as well as their integration to form the aircraft. As a result, a manufacturer is often unwilling to provide these models to customers or maintenance companies.

The different advantageous embodiments also recognize and take into account that the three-dimensional models or information in the three-dimensional models may be regulated by export laws in the United States and other countries. This data may include production or development information about composite materials or laminates. Other export controlled information in these models includes, for example, without limitation, composite material properties and the design of tools used to manufacture composite parts. As a result, a manufacturer is often legally unable to provide these models to customers or maintenance companies.

The different advantageous embodiments provide a method and apparatus for processing a model of a part. In response to receiving a request from a client application for information about a number of locations on the part, the number of locations in the model of the part is identified. A section cut is created at each of the number of locations in the model of the part to form a number of section cuts. Data is obtained for the number of layers in each of the number of section cuts. The model with the number of section cuts is changed to form a formatted model with a format used by the client application to display the formatted model. The number of layers in each of the number of section cuts in the formatted model is associated with the data for the number of layers in each of the number of section cuts to form an association between the model and the data.

FIG. 4 is an illustration of a network of data processing systems in which advantageous embodiments may be implemented. Network data processing system 400 is an example of a hardware environment in which different advantageous embodiments may be implemented. Specifically, network data processing system 400 may be used to implement an environment providing ply layup data for use in performing maintenance activities.

Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server 404 and server 406 connect to network 402, along with storage unit 408. In addition, clients 410, 412, and 414 connect to network 402. Clients 410, 412, and 414 may be, for example, workstation computers or network computers. In the depicted example, server 404 provides data, such as boot files, operating system images, and applications to clients 410, 412, and 414. Clients 410, 412, and 414 are clients to server 404 in this example.

As depicted, client 410 is located in maintenance facility 416, while server 404 is located in manufacturer facility 418. Maintenance facility 416 is a location where maintenance and repairs may be performed on aircraft. The maintenance and repairs are referred to collectively as maintenance operations. Manufacturer facility 418 is a location where three-dimensional models for aircraft may be created and/or maintained. Additionally, data about the parts or structures represented by the three-dimensional models for aircraft also may be maintained at manufacturer facility 418.

In these different examples, server 404 in manufacturer facility 418 may provide ply layup data for use in performing maintenance and repairs on aircraft to client 410 at maintenance facility 416. Manufacturer facility 418 may be owned by the same or separate entities from maintenance facility 416.

The ply layup data may be provided using network data processing system 400 in a manner that avoids some or all of the issues associated with an unavailability of two-dimensional drawings, manuals, or another hard copy form. For example, this data may be provided in a manner that avoids having a customer purchase and operate computer-aided design software to view three-dimensional models.

The different advantageous embodiments also may be used to limit the amount of data that is provided to other parties or users. The manufacturer of the aircraft does not need to supply three-dimensional models that may contain confidential data to customers. Instead, only data relating to the ply layup of the part for which maintenance is being performed is provided, in the different examples.

Network data processing system 400 may include additional servers, clients, and other devices not shown. In the depicted example, network data processing system 400 is the Internet with network 402 representing a worldwide collection of networks and gateways that use the Transmission Control Protocol/Internet Protocol (TCP/IP) suite of protocols to communicate with one another.

At the heart of the Internet is a backbone of high-speed data communication lines between major nodes or host computers, consisting of thousands of commercial, governmental, educational, and other computer systems that route data and messages. Of course, network data processing system 400 also may be implemented as a number of different types of networks such as, for example, an intranet, a local area network (LAN), or a wide area network (WAN). FIG. 4 is intended as an example and not as an architectural limitation for the different embodiments.

Figure 5:
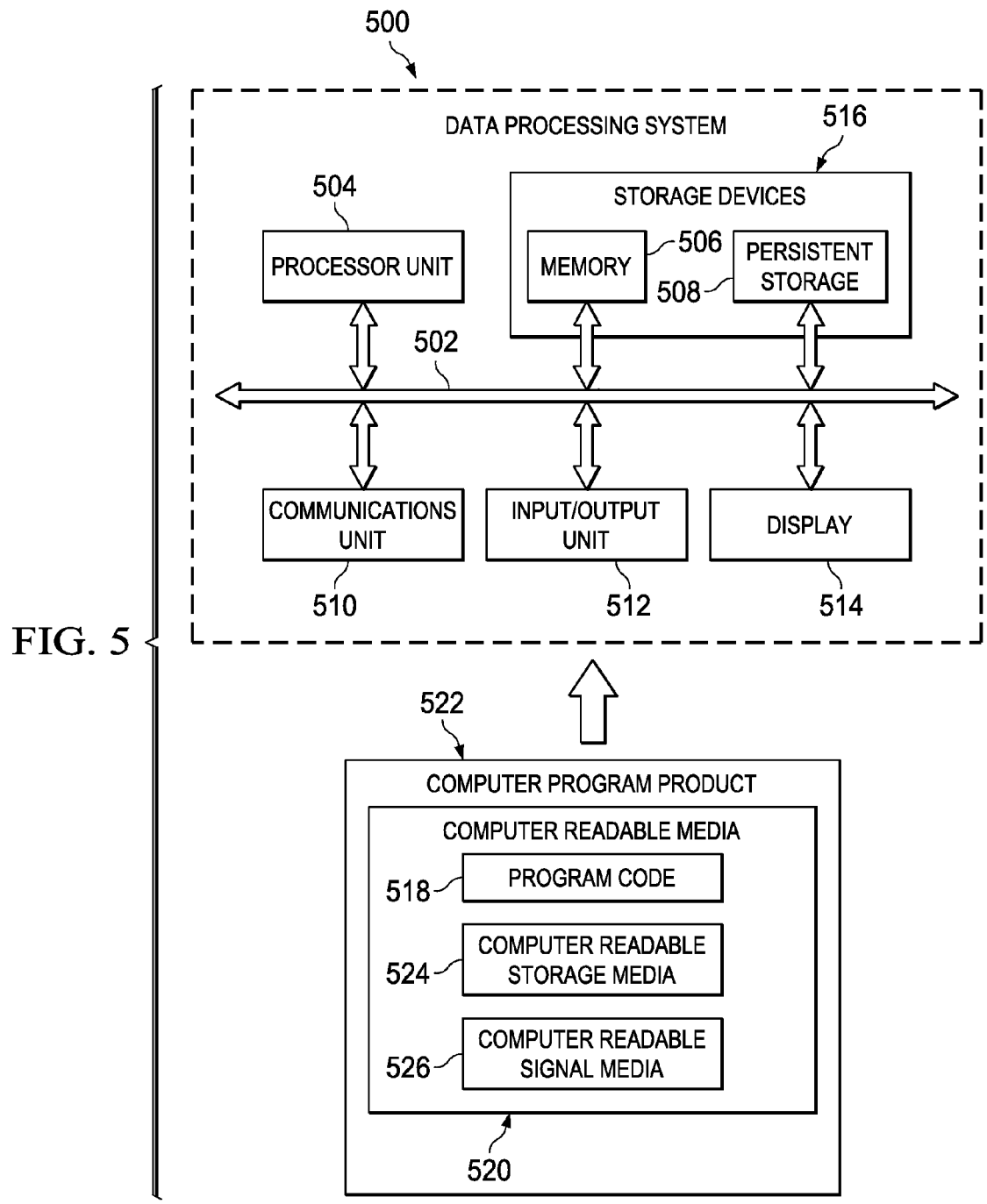
FIG. 5 is an illustration of a data processing system in accordance with an advantageous embodiment.

Turning now to FIG. 5, an illustration of a data processing system is depicted in accordance with an advantageous embodiment. In this advantageous example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another advantageous example, processor unit 504 may be a symmetric multi-processor system containing multiple processors of the same type.

Memory 506 and persistent storage 508 are examples of storage devices 516. A storage device is any piece of hardware that is capable of storing information such as, for example, without limitation, data, program code in functional form, and/or other suitable information either on a temporary basis and/or a permanent basis. Memory 506, in these examples, may be, for example, a random access memory or any other suitable volatile or non-volatile storage device.

Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communication links, such as wireless communication links, an optical fiber cable, a coaxial cable, a wire, and/or any other suitable type of communication link. In other words, the communication link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
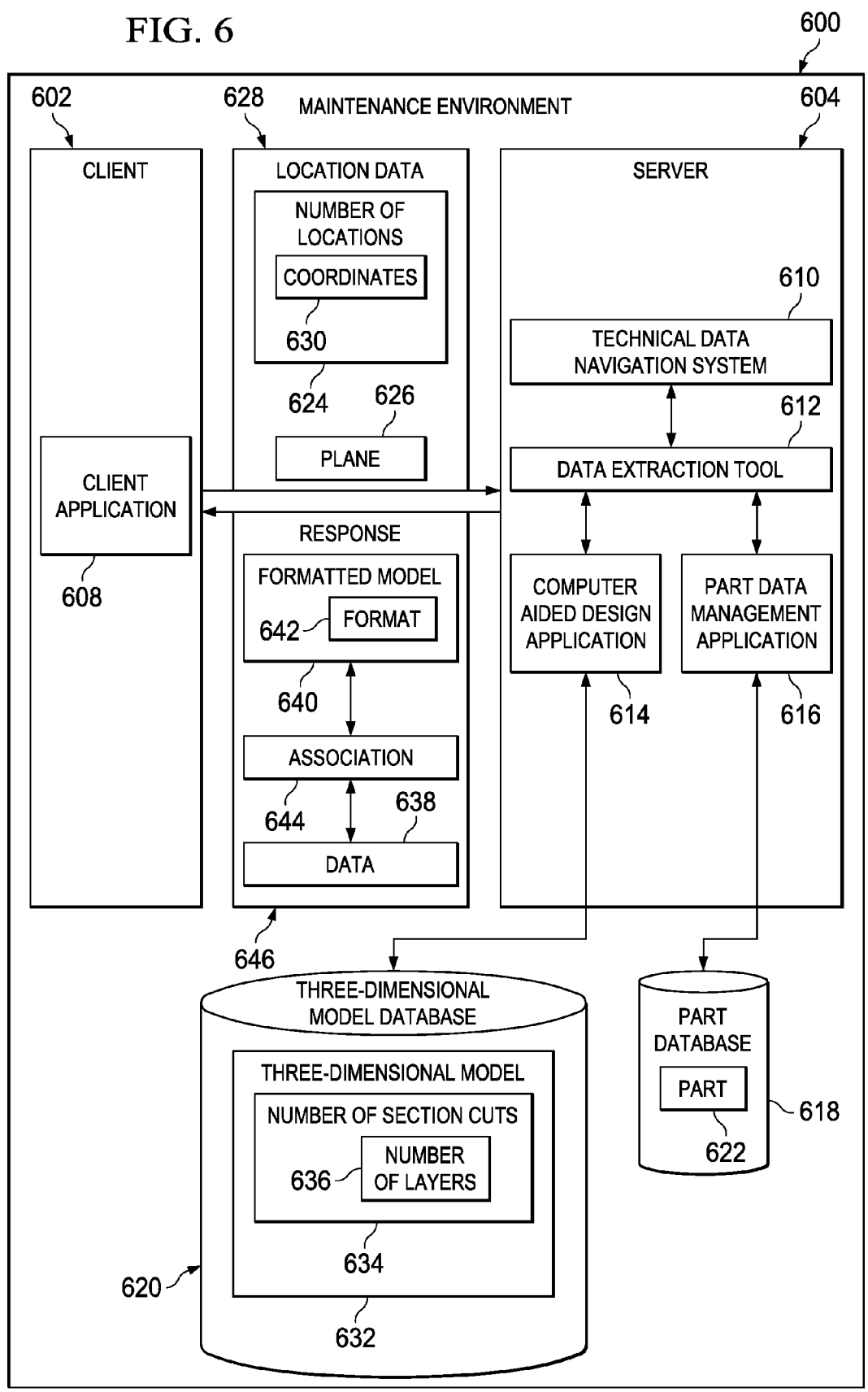
FIG. 6 is an illustration of a block diagram illustrating components used to provide ply layup data for a composite part in accordance with an advantageous embodiment.

Turning now to FIG. 6, an illustration of a block diagram illustrating components used to provide ply layup data for a composite part is depicted in accordance with an advantageous embodiment. In this example, maintenance environment 600 is an environment in which layup data for composite parts may be identified for use in performing maintenance operations.

As depicted, maintenance environment 600 includes client 602 and server 604. Client 602 includes client application 608. Server 604 includes technical data navigation system 610, data extraction tool 612, computer aided design application 614, and part data management application 616. In these examples, client 602 may be, for example, client 410 located in maintenance facility 416 in FIG. 4. Server 604 may be implemented using server 404 in manufacturer facility 418 in FIG. 4. Also, server 604 may be implemented using the same server or another server, such as server 406 in FIG. 4.

These maintenance operations may include repairs of composite parts, such as composite part 300 in FIG. 3. Technical data navigation system 610 provides client application 608 access to information about parts in part database 618 and three-dimensional parts in three-dimensional model database 620.

In these illustrative examples, technical data navigation system 610 is a server process on server 604 and may be, for example, a web server or some other suitable type of server or process. Client application 608 may take various forms. For example, without limitation, client application 608 may be a web browser, a viewer for computer aided design models, and/or some other suitable type of program.

In these illustrative examples, technical data navigation system 610 provides client application 608 a listing of parts in part database 618. When a user or other operator of client application 608 selects or identifies part 622 in part database 618, client application 608 may display a three-dimensional representation of part 622. In these examples, the part is a composite part. For example, the user may select number of locations 624 on a three-dimensional object of a part displayed through a user interface in client application 608 to indicate one or more locations at which a rework or other maintenance operation is to occur for that part. Further, the user may select plane 626 for use in making a section cut in the number of locations.

The selection of number of locations 624 and plane 626 forms location data 628. In these examples, the number of locations selected may take the form of coordinates 630. Coordinates 630 define a location on the composite part. Coordinates 630 may be three-dimensional coordinates. More specifically, location data 628 includes the location in X, Y, and Z coordinates. Of course, other coordinate systems may be used, depending on the particular implementation. Coordinates 630 also may define plane 626. Plane 626 may be used to identify information about the different layers in the part.

As another example, a spherical coordinate system may be used to identify the location of the composite part. Further, location data 628 also may include an identification of the composite part. This identification may be, for example, a part number. Location data 628 also may include, for example, without limitation, an identification of the type of aircraft or even a specific aircraft using a tail number.

Technical data navigation system 610 receives location data 628 from client application 608. Location data 628 is sent to data extraction tool 612 from technical data navigation system 610. Data extraction tool 612 may be a separate program or application. When data extraction tool 612 is a separate program, data extraction tool 612 makes calls to computer aided design application 614 to obtain access to three-dimensional model 632 in three-dimensional model database 620 for part 622. These calls may be made using application interfaces for computer-aided design application 614.

In other examples, data extraction tool 612 may take the form of a process that is part of computer-aided design application 614. In these illustrative examples, computer aided design application 614 may be, for example, CATIA V5R17. This type of program is available from Dassault Systémes.

Data extraction tool 612 may make number of section cuts 634 in three-dimensional model 632. Number of section cuts 634 is made using location data 628 and plane 626 in these illustrative examples. Number of layers 636 is present in each of number of section cuts 634.

In these illustrative examples, data extraction tool 612 also accesses data 638 for part 622 in part database 618. Data 638 may be information about number of layers 636 for each of number of section cuts 634 in three-dimensional model 632 for part 622. In these examples, data 638 is information for number of layers 636 at number of locations 624 for each of number of section cuts 634. For example, when number of layers 636 takes the form of plies, data 638 may include information about the type of ply layer, the orientation of the ply layer, the sequence of ply layers, and other information at the particular location in which the section cut is made.

In these illustrative examples, data extraction tool 612 accesses data 638 through part data management application 616. Part data management application 616 is a program that organizes and provides access to data 638 in part database 618. As one example, part database 618 may be implemented using Enovia Lifecycle Applications (LCA) supplied by Dassault Systémes.

Data extraction tool 612 changes three-dimensional model 632 with number of section cuts 634 to form formatted model 640. Formatted model 640 is a three-dimensional model of part 622 and has format 642, which is used by client application 608 to display formatted model 640. In changing three-dimensional model 632, data extraction tool 612 may remove unnecessary data. Unnecessary data is any information not needed for the rework and/or maintenance of part 622. In other illustrative examples, the format of information within three-dimensional model 632 may be changed such that formatted model 640 can be viewed by applications other than computer aided design application 614.

Additionally, data extraction tool 612 associates number of layers 636 in each of number of section cuts 634 in formatted model 640 with data 638 for number of layers 636 in each of number of section cuts 634 to form association 644 between formatted model 640 and data 638. Formatted model 640 and data 638 form response 646. Response 646 is returned to client application 608 by technical data navigation system 610.

The illustration of maintenance environment 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, data extraction tool 612 may directly access part database 618 and three-dimensional model database 620. In yet other advantageous embodiments, data 638 for part 622 may be located in three-dimensional model 632 for part 622.

Also, in some illustrative examples, plane 626 may not be defined at client application 608. Instead, plane 626 may be selected or set by data extraction tool 612. For example, data extraction tool 612 may select plane 626 to be normal or perpendicular to a surface or point on three-dimensional model 632 at each location in number of locations 624.

As another example, details about other parts, their assembly, and architecture may not be provided when three-dimensional model 632 is changed to formatted model 640. For example, information about wiring, electronics, and assembly of substructures do not need to be provided for use in maintenance of composite parts. Additionally, this type of implementation allows a manufacturer to provide data in a faster manner as compared to having a user locate and extract the data themselves. This type of architecture provides a quicker means for communication and avoids having the user manually measure and identify the coordinates on the aircraft.

As can be seen in this illustrative embodiment, ply layup data may be supplied to a user to perform maintenance on an aircraft without needing manuals containing drawings of the composite parts. Although the advantageous embodiments are described with respect to composite parts, in which number of layers 636 is a number of plies, the different advantageous embodiments may be applied to other types of parts.

Figure 7:
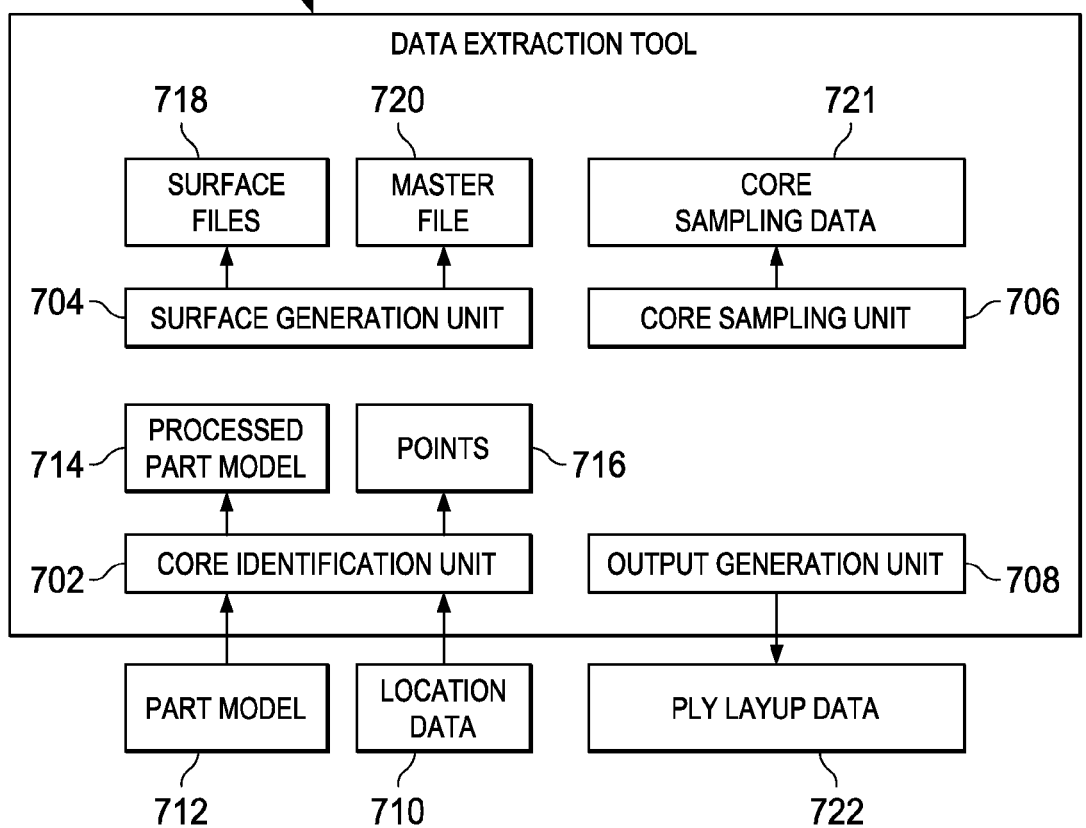
FIG. 7 is an illustration of a data extraction tool in accordance with an advantageous embodiment.

With reference now to FIG. 7, an illustration of a data extraction tool is depicted in accordance with an advantageous embodiment. In this example, data extraction tool 700 is an example of one implementation for data extraction tool 612 in FIG. 6. Data extraction tool 700 includes core identification unit 702, surface generation unit 704, core sampling unit 706, and output generation unit 708.

Core identification unit 702 receives location data 710 and part model 712. Part model 712 is a three-dimensional model of a part in these examples. Core identification unit 702 creates an axis system, including a damage axis, in part model 712 at the damage location based on location data 710. This damage axis is normal to the surface at the damage location in part model 712 and parallel to a rosette axis. Further, core identification unit 702 creates section cuts that intersect the surface and plies based on these section cuts and part model 712. Each section cut is a curve formed by the intersection of a plane and the surface of part model 712.

Core identification unit 702 may store this information as processed part model 714. Additionally, core identification unit 702 also may generate points 716. Points 716 are a file containing points where core sampling is to be performed. In these examples, the points are points along the section cuts. For example, for a section cut, a number of points are selected on the surface for the section cut. Points 716 take the form of an extensible markup language (XML) file in these examples. Of course, these points may be saved in other types of data structures, depending on the implementation. In these illustrative examples, processed part model 714 contains the section cuts. Processed part model 714 may be used to form formatted model 640 in FIG. 6.

Master file 720 includes, for example, the part name, the sequence, the ply name, and other attributes. These attributes include, for example, a link to a surface file in surface files 718 containing the surface visualization data. The data is ordered in the master file according to the ply sequence in the part.

Each file within surface files 718 represents a portion of the surface of the part where sampling is to occur. Each file in surface files 718 includes, for example, without limitation, an identification of a point on the surface and other data used to identify and/or visualize the surface at that point.

In the illustrative examples, core sampling unit 706 performs sampling using processed parts model 714, surface files 718, and master file 720. Core sampling unit 706 is used to perform the actual sampling. In these examples, core sampling unit 706 may be an OpenGL based application, program, and/or process. Of course, any type of application, program, and/or process that is capable of obtaining information about layers in a model may be used.

Core sampling unit 706 generates core sampling data 721. For example, master file 720 is used to identify a surface file from surface files 718 for processing or sampling. The identified surface file is used to perform sampling for the point identified by the surface file. This sampling generates data about different layers in a line below the sampling point in these illustrative examples. The line may be selected based on the damage axis that is identified.

In these examples, surface files 718 and master file 720 take the form of extensible markup language (XML) files. Core sampling data 721 also takes the form of an extensible markup language file in these examples.

Core sampling data 721 includes core sample data. In other words, this data includes data obtained from sampling based on the identification of the core or section to be sampled in the part. Core sampling data 721 also includes, for example, an identification of plies that were pierced, data, and other suitable information.

Output generation unit 708 takes core sampling data 721 and generates ply layup data 722. Ply layup data 722 is an example of data 638 in FIG. 6. Ply layup data 722 may be, for example, a file or other document containing ply layup information in a form that is suitable for presentation. In these examples, the format takes the form of an extensible markup language (XML) format or portable document format. This format may include text, images, two-dimensional vector graphics, or other information. Of course, ply layup data 722 may be stored using other formats. Other formats may provide a capability to display or view data using three-dimensional graphics.

The illustration of data extraction tool 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, data extraction tool 700 may be part of a computer-aided design program. In yet other advantageous embodiments, output generation unit 708 may be implemented as a separate process.

Figure 8:
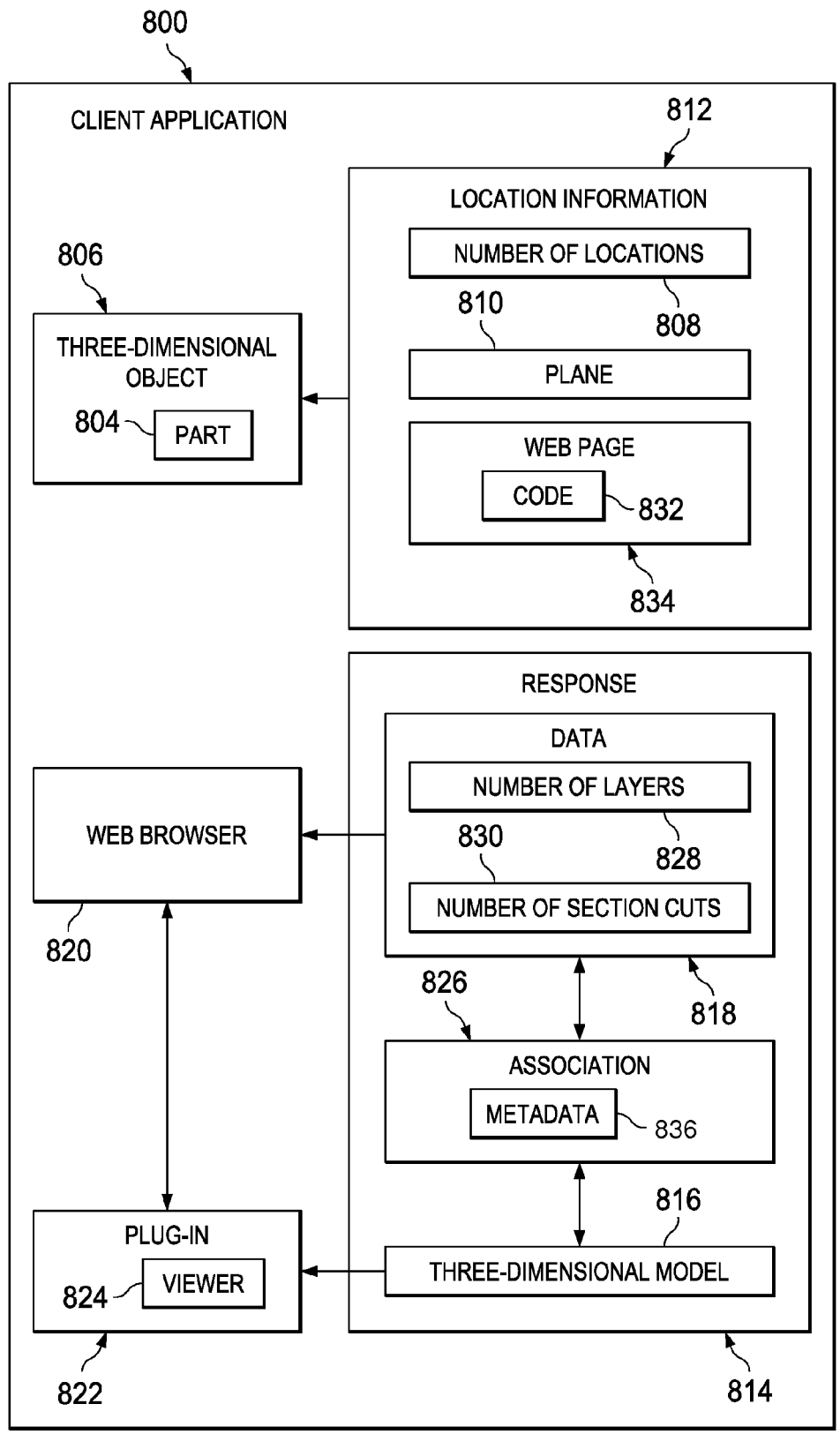
FIG. 8 is an illustration of a client application in accordance with an advantageous embodiment.

With reference now to FIG. 8, an illustration of a client application is depicted in accordance with an advantageous embodiment. Client application 800 is an example of one implementation for client application 608 in FIG. 6.

In this illustrative example, client application 800 is configured to present part 804 as three-dimensional object 806. A user may select plane 810 and number of locations 808 for part 804. This information is sent as location information 812, and response 814 is received. Response 814 includes three-dimensional model 816 and data 818 for part 804. Response 814 may take the form of a web page in these illustrative examples. Response 814 is presented by client application 800.

In this illustrative example, client application 800 takes the form of web browser 820 and plug-in 822. Web browser 820 is software or program code that retrieves, prevents, and traverses information on the Internet. In particular, web browser 820 traverses various resources on the Worldwide Web. Additionally, web browser 820 may traverse information located by servers on a private or a closed network or file system.

In this illustrative example, plug-in 822 is software or program code that interacts with web browser 820. Plug-in 822 may take the form of viewer 824. Viewer 824 is configured to present three-dimensional model 816. In these examples, three-dimensional model 816 takes the form of formatted model 640 generated by data extraction tool 612 in FIG. 6. Further, viewer 824 may allow user input to manipulate three-dimensional model 816. Viewer 824 may be, for example, without limitation, a 3DVIA Composer Player, which is available from Dassault Systèmes. In some examples, viewer 824 may be Cortona3D Viewer, which is available from Cortona3D; Adobe Reader, which is available from Adobe Systems; or a lattice viewer.

Additionally, plug-in 822 also may present data 818. Data 818, for example, without limitation, is a sequence of layers, orientation information, material information, and other suitable information.

Further, plug-in 822 may use association 826 between three-dimensional model 816 and data 818 to correlate number of layers 828 for number of section cuts 830 in three-dimensional model 816 to the information about the layers in the section cuts in data 818. In other words, a selection of a layer within number of layers 828 for a section cut in number of section cuts 830 in data 818 causes plug-in 822 to graphically indicate the corresponding layer in three-dimensional model 816.

In some advantageous embodiments, plug-in 822 may only take the form of a viewer. In this type of embodiment, web browser 820 may execute code 832 in web page 834 returned in response 814 to correlate the selection of data with the particular layer in three-dimensional model 816. Code 832 may be a script that uses metadata 836 that describes association 826. Code 832 may make calls to viewer 824 to graphically indicate a selected layer.

The illustration of client application 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, client application 800 may be implemented as a program other than a web browser. For example, client application 800 may be a viewer that is configured to generate location data and receive responses.

Figure 9:
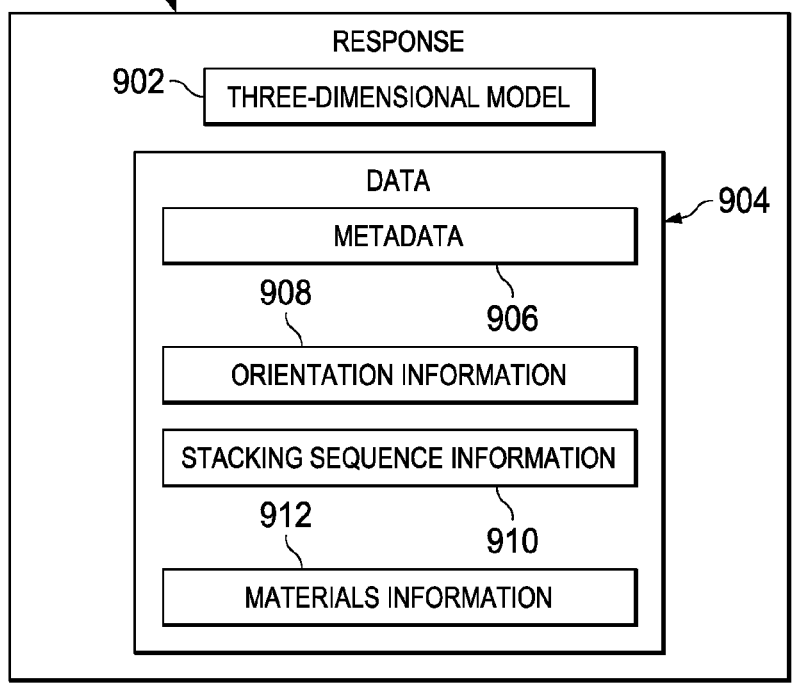
FIG. 9 is an illustration of a response in accordance with an advantageous embodiment.

Turning now to FIG. 9, an illustration of a response is depicted in accordance with an advantageous embodiment. Response 900 is an example of one implementation for response 646 in FIG. 6.

In this illustrative example, response 900 includes three-dimensional model 902, data 904, and metadata 906. Three-dimensional model 902 is an example of formatted model 640 in FIG. 6. Three-dimensional model 902 is in a format that is used by the client application receiving response 900 to present three-dimensional model 902. In these illustrative examples, three-dimensional model 902 may be a computer-aided design file configured for display by a viewer, such as viewer 824 in FIG. 8.

As depicted, data 904 includes metadata 906, orientation information 908, stacking sequence information 910, and materials information 912. In the illustrative examples, data 904 may be in an extensible markup language (XML) format.

Metadata 906 provides a correlation between layers in data 904 and three-dimensional model 902. For example, when data 904 is presented, a selection of a layer within data 904 may cause an indication of the corresponding layer within three-dimensional model 902 to be presented.

Figure 10:
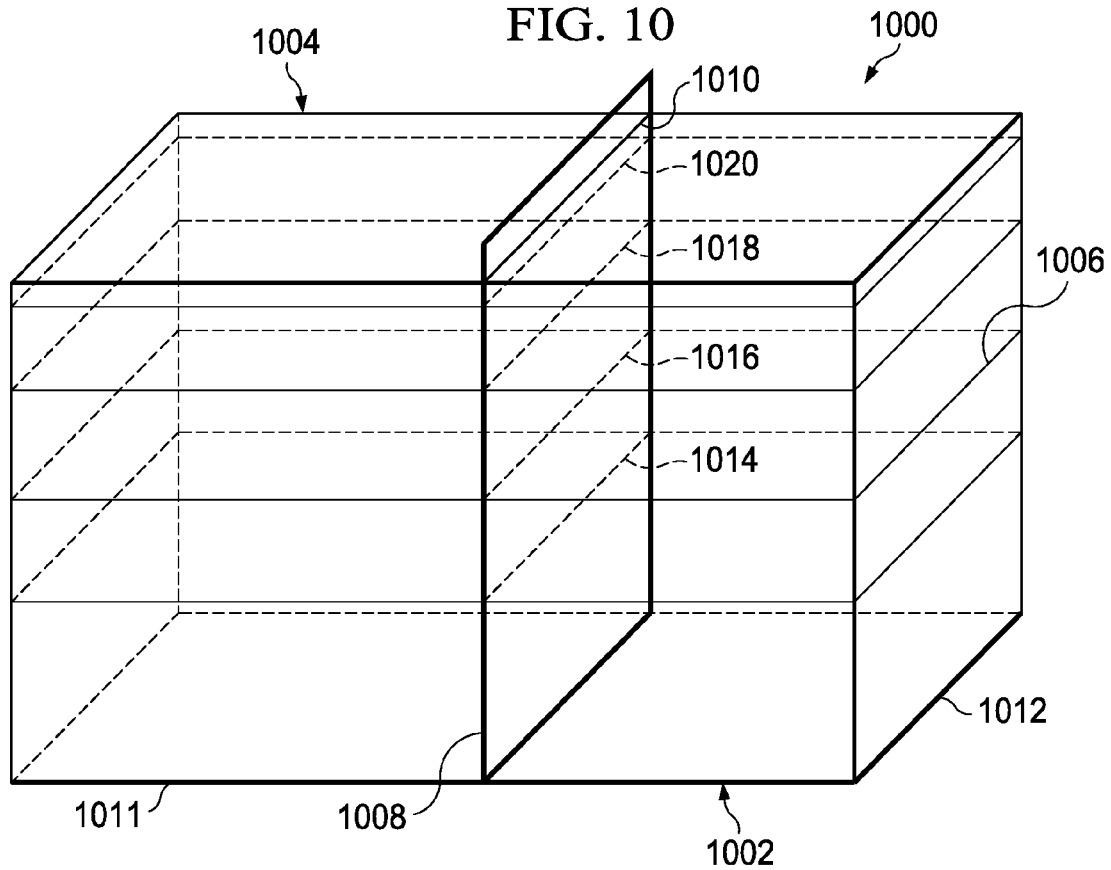
FIG. 10 is an illustration of a portion of a part in accordance with an advantageous embodiment.

With reference now to FIG. 10, an illustration of a portion of a part is depicted in accordance with an advantageous embodiment. In this example, part 1000 may be a part found in part database 618 in FIG. 6.

In this illustrative example, part 1000 has base surface 1002 and top surface 1004. Layers, in the form of plies 1006, may be found between top surface 1004 and base surface 1002. In this illustrative example, plane 1008 intersects part 1000. Plane 1008 may be defined by a user and may be, for example, plane 626 in FIG. 6. In other examples, plane 1008 may be a plane selected by data extraction tool 612 in FIG. 6. In this example, the intersection may be substantially normal to top surface 1004 at line 1010. Plane 1008 is a virtual mathematical plane used as a boundary to form an intersection with part 1000 to identify ply data.

This planar intersection by plane 1008 may be performed using data extraction tool 612 in FIG. 6. In these examples, coordinates U and V may define the planar intersection with plies 1006 in part 1000. As shown in this illustrated example, part 1000 has U axis 1011 for the U coordinates and V axis 1012 for the V coordinates. These axes are relative to plane

1008. Plane 1008 is used as a boundary with the coordinates defining the plane intersecting each ply within plies 1006 within part 1000.

The intersection with each ply in plies 1006 results in a line such as, for example, lines 1014, 1016, 1018, and 1020. In this illustrative example, each line represents a top portion of a ply intersected by plane 1008. Of course, other lines may be present, depending on the number of plies present in the intersection of plane 1008 in part 1000. These lines may be described using coordinates U and V that are relative to plane 1008. Further, the intersection represented by the lines may be given a linear approximation using X, Y, and Z coordinates. In other words, the U and V coordinates for plane 1008 may be translated into X, Y, and Z coordinates, or some other coordinate system.

Based on this information, ply data may be obtained for each line within plane 1008. Each line may be placed on top of the next line starting from base surface 1002 all the way up through top surface 1004. This data may be used to generate a presentation of ply layup data for part 1000.

Figure 11:
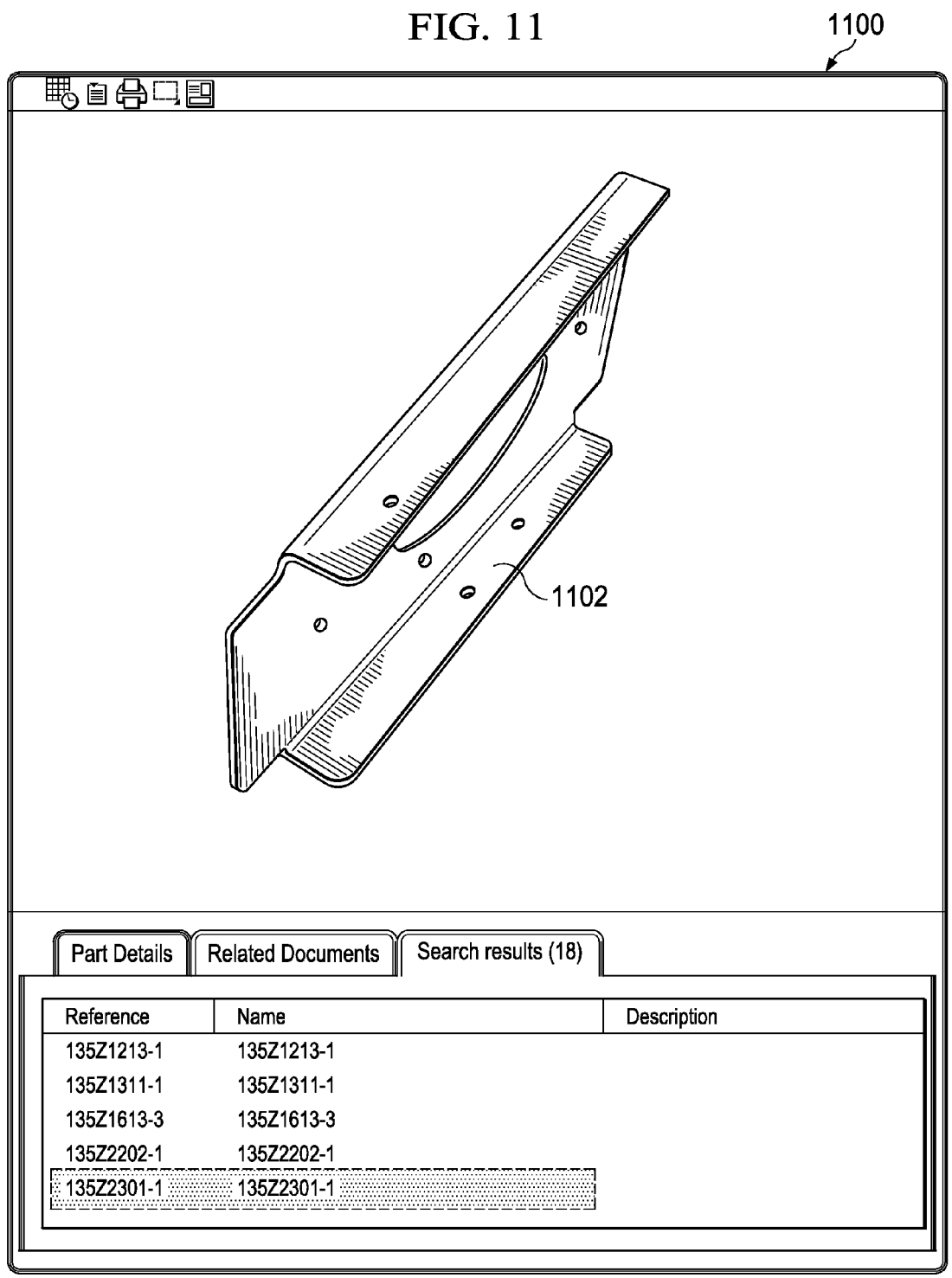
FIG. 11 is an illustration of a part in accordance with an advantageous embodiment.
Figure 12:
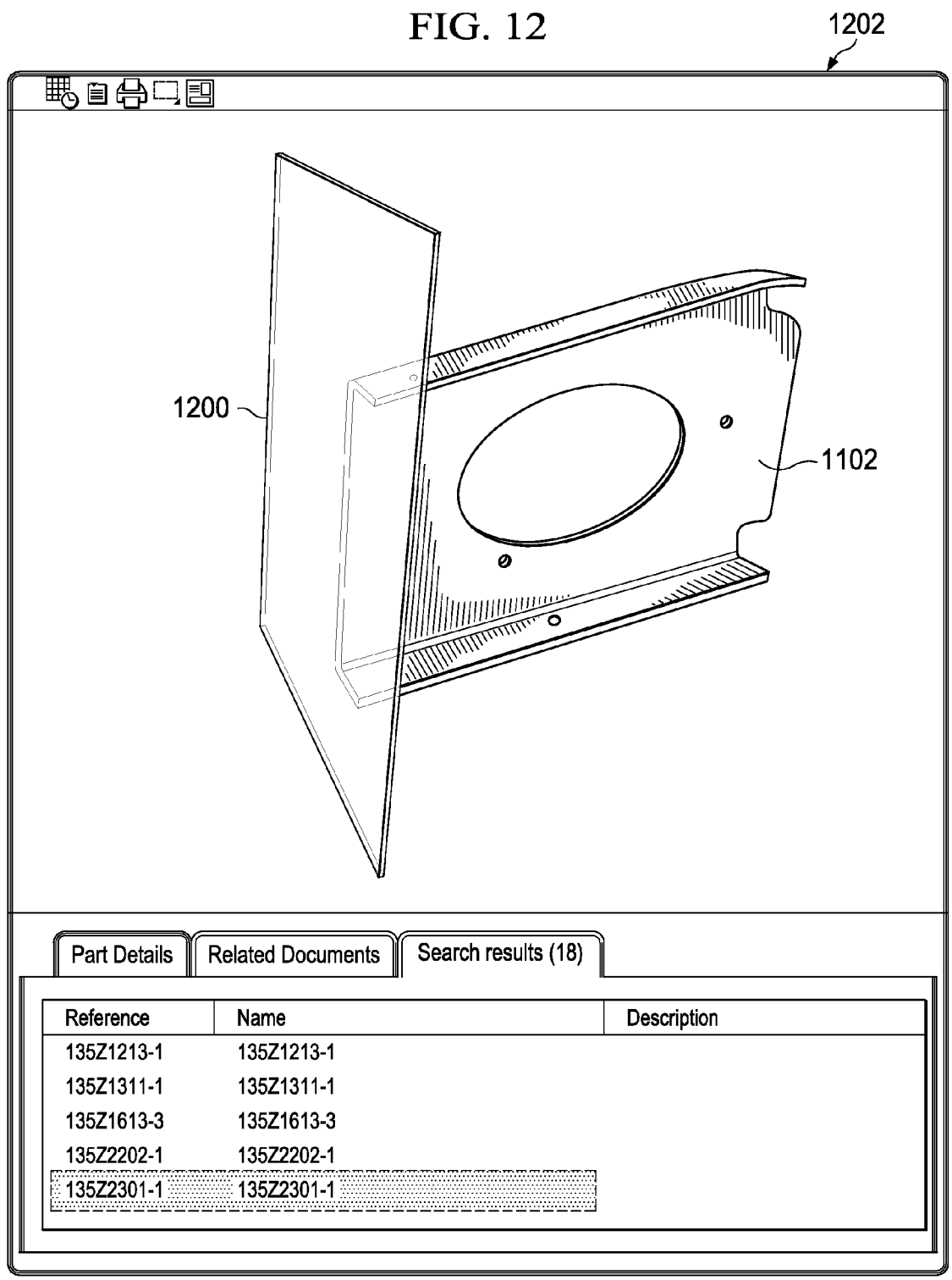
FIG. 12 is an illustration of defining location data in accordance with an advantageous embodiment.
Figure 13:
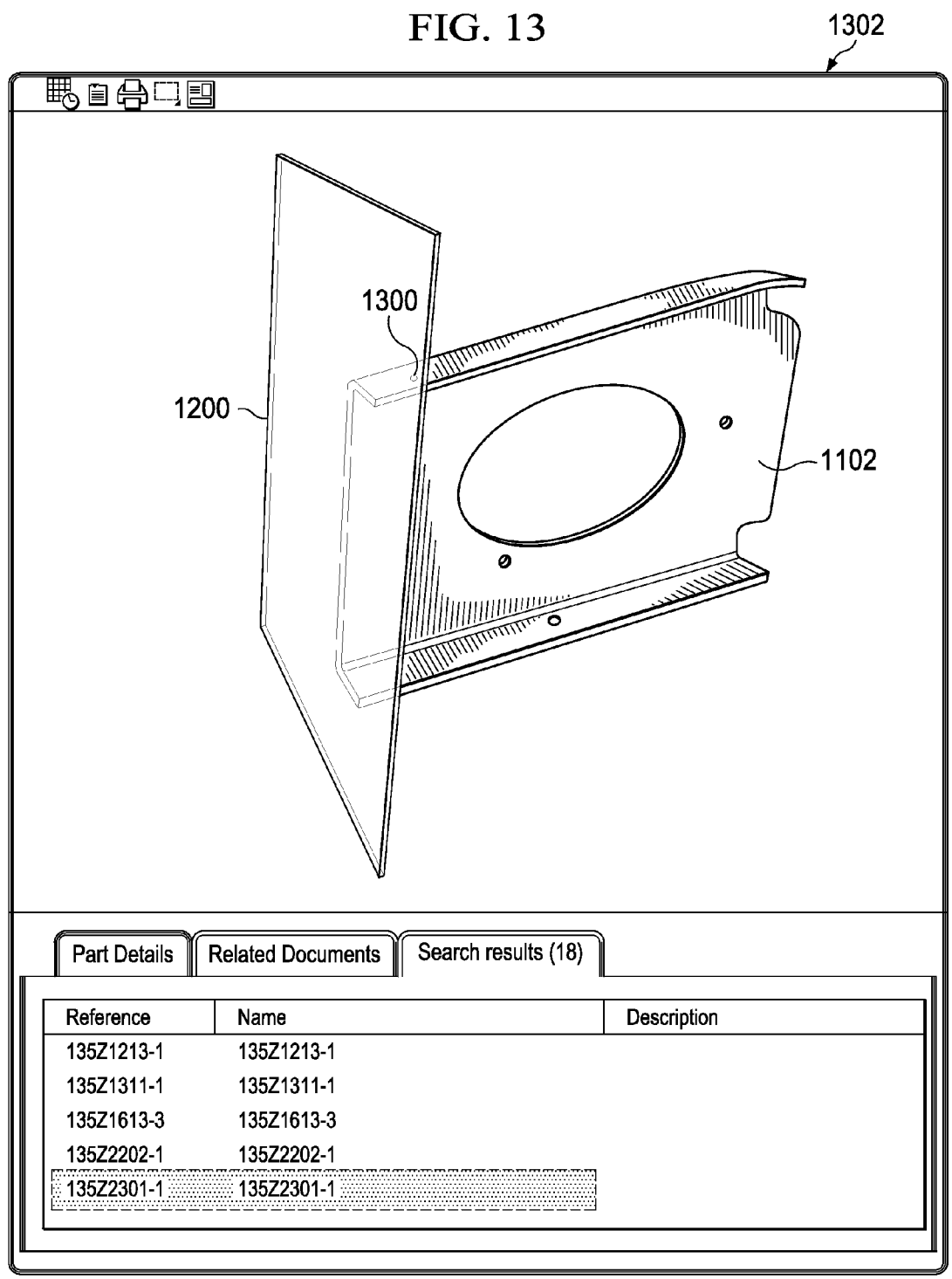
FIG. 13 is an illustration of a selection of a location in accordance with an advantageous embodiment.

With reference now to FIGS. 11-13, illustrations of defining location data are depicted in accordance with an advantageous embodiment. In FIG. 11, an illustration of a part is depicted in accordance with an advantageous embodiment. Display 1100 is an example of a display that may be presented by client application 608 in FIG. 6. In display 1100, part 1102 is presented as a three-dimensional object. Part 1102 may be manipulated through user input.

With reference next to FIG. 12, an illustration of a selection of a plane is depicted in accordance with an advantageous embodiment. In this illustrative example, plane 1200 is selected for part 1102 in display 1202. Plane 1200 is selected such that plane 1200 passes through a location selected for a section cut.

The orientation of plane 1200 may be selected by a user. For example, plane 1200 may be selected such that plane 1200 is normal to a surface of part 1102. In other examples, plane 1200 may be selected to be at some other angle relative to part 1102. In these examples, plane 1200 may pass through part 1102 with a portion of part 1102 normal to plane 1200 not seen in display 1202. In other examples, all of part 1102 may be seen in display 1202, depending on the viewer used for display 1202.

Turning next to FIG. 13, an illustration of a selection of a location is depicted in accordance with an advantageous embodiment. In this illustrative example, point 1300 in display 1302 has been selected as a location for a section cut. Further, plane 1200 is selected such that plane 1200 passes through point 1300.

Figure 14:
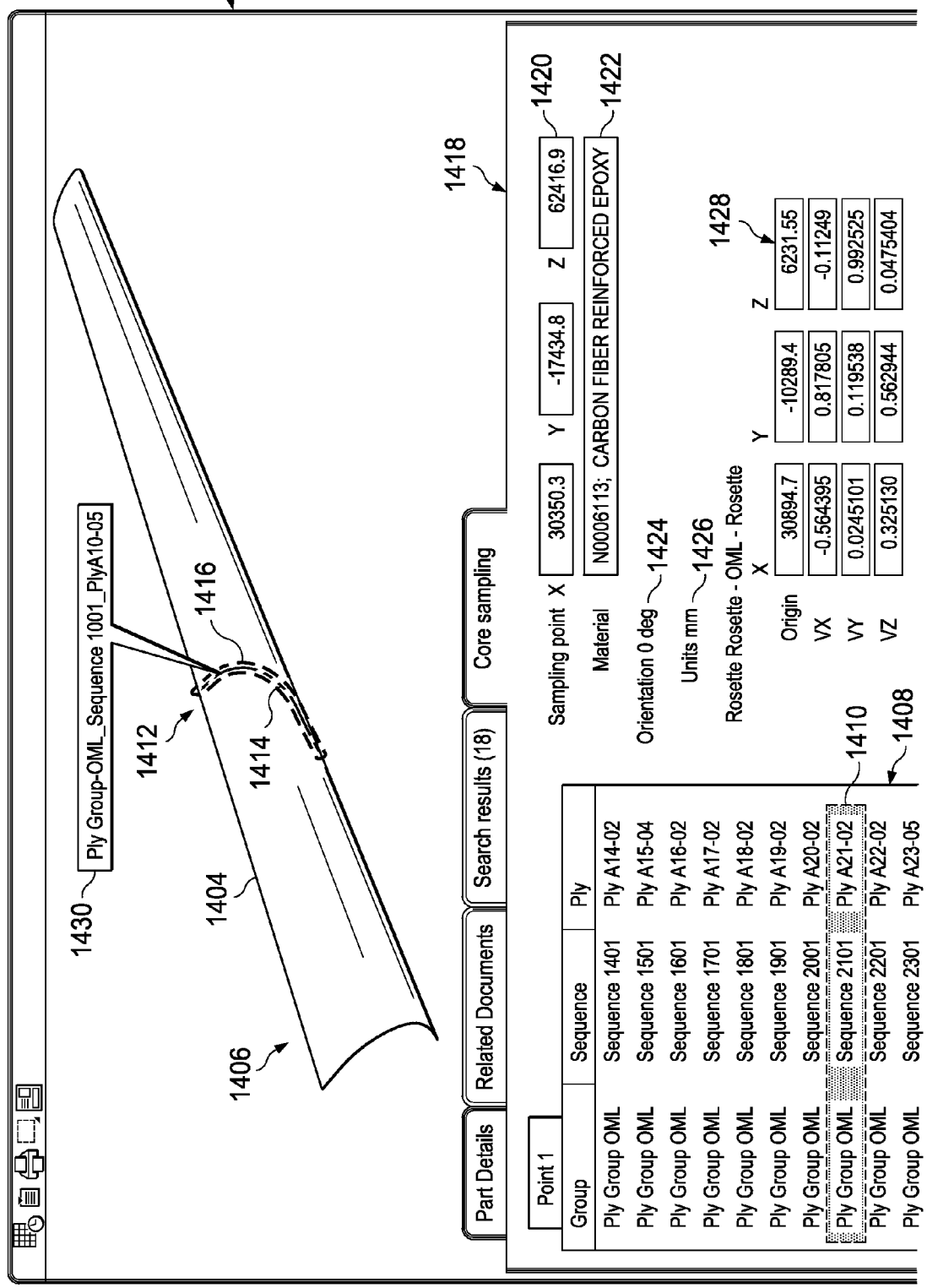
FIG. 14 is an illustration of a presentation of ply layup data in accordance with an advantageous embodiment.

With reference now to FIG. 14, an illustration of a presentation of ply layup data is depicted in accordance with an advantageous embodiment. In this illustrative example, display 1400 is an example of a display that may be presented by client application 608 in FIG. 6. In this illustrative example, display 1400 presents ply layup data extracted for a part in response to receiving location data for the part.

In this illustrative example, section 1402 illustrates three-dimensional model 1404 of part 1406. Section 1408 illustrates an identification of layers within three-dimensional model 1404. In this illustrative example, layer 1410 has been selected in section 1408. In response to the selection of layer 1410, graphical indicator 1412 is displayed in three-dimensional model 1406 of part 1404. Graphical indicator 1412 identifies layer 1410 in three-dimensional model 1406. In this example, layer 1410 in section 1408 corresponds to layer 1414 in three-dimensional model 1406. In this example, graphical indicator 1412 takes the form of highlighting 1416 of layer 1414.

Information about layer 1414 is shown in section 1418. In this illustrative example, section 1418 identifies information, such as sampling location 1420, material 1422, orientation information 1424, units 1426, and reference axis 1428.

In this example, graphical indicator 1412 also may include pop-up window 1430. As illustrated, pop-up window 1430 contains data about the selected layer, layer 1410 in these examples.

The illustration of the displays in FIGS. 11-14 is not meant to imply physical or architectural limitations to the manner in which different displays may be presented. In other advantageous embodiments, other sections, in addition to those shown, may be used. In addition, sections may be shown separately in different windows or displays rather than in a single display. Additionally, a grid also may be shown in two dimensions, or a two-dimensional drawing may be used in some advantageous embodiments.

Figure 15:
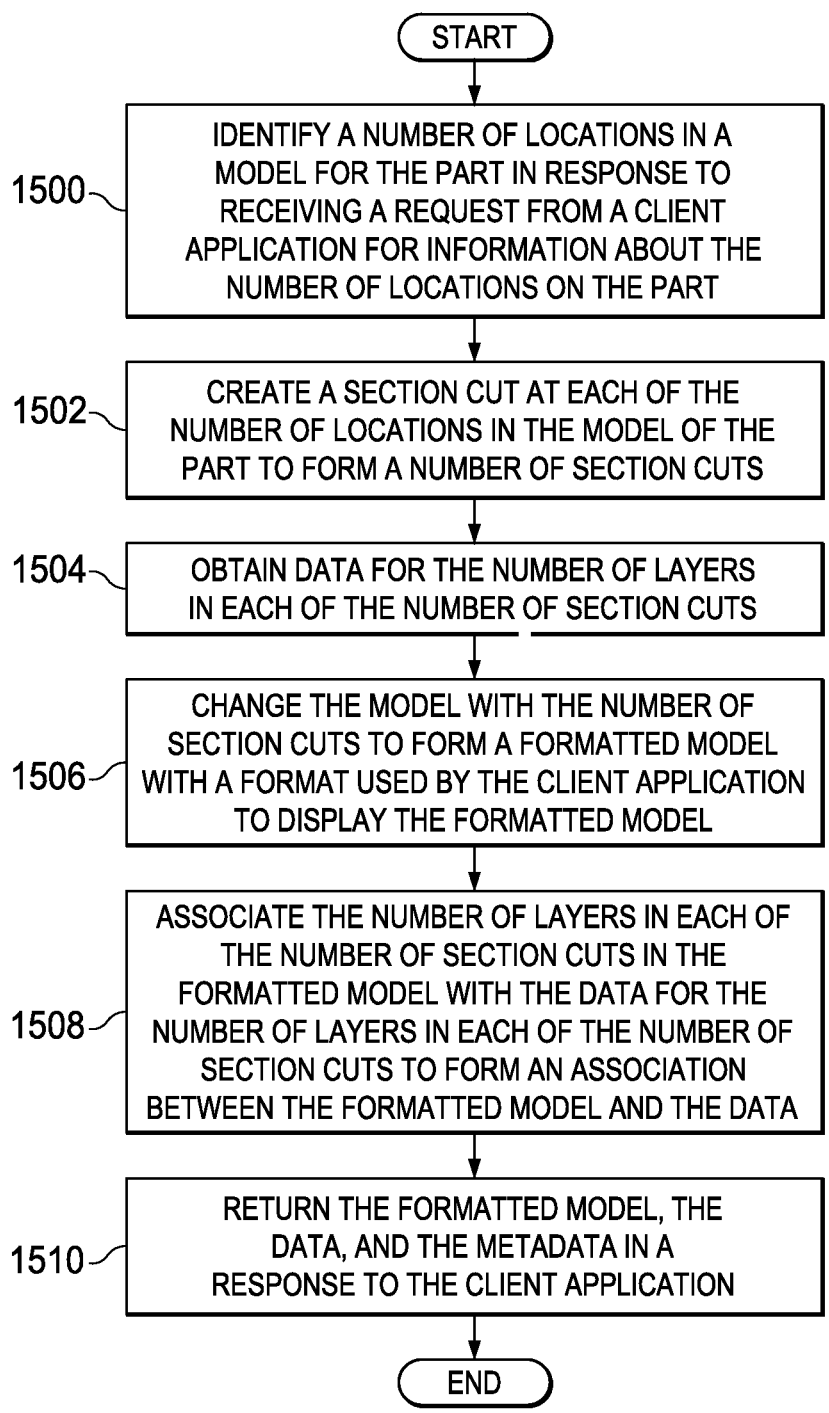
FIG. 15 is an illustration of a flowchart for processing a model of a part in accordance with an advantageous embodiment.

With reference now to FIG. 15, an illustration of a flowchart for processing a model of a part is depicted in accordance with an advantageous embodiment. The process illustrated in FIG. 15 may be implemented in data extraction tool 612 in FIG. 6.

The process begins by identifying a number of locations in a model for the part in response to receiving a request from a client application for information about the number of locations on the part (operation 1500). In these illustrative examples, the model is a three-dimensional model. Of course, other models, such as a two-dimensional model, may be used.

A section cut is created at each of the number of locations in the model of the part to form a number of section cuts (operation 1502). Data is obtained for the number of layers in each of the number of section cuts (operation 1504). The model with the number of section cuts is changed to form a formatted model with a format used by the client application to display the formatted model (operation 1506). In this example, a model that is changed contains the information or identification of the number of section cuts.

The number of layers in each of the number of section cuts in the formatted model is associated with the data for the number of layers in each of the number of section cuts to form an association between the formatted model and the data (operation 1508). This association may be formed using metadata. The metadata may identify the correlation between data for a particular layer in the part with the corresponding layer in the formatted model of the part.

In some advantageous embodiments, the metadata may include the identification of calls that may be made to a program or viewer that may be presenting the formatted model. The formatted model, the data, and the metadata are returned in a response to the client application (operation 1510), with the process terminating thereafter. The client application may then display the drawing, and maintenance operations may be performed in response to the presentation of the operation displayed by the client application.

Figure 16:
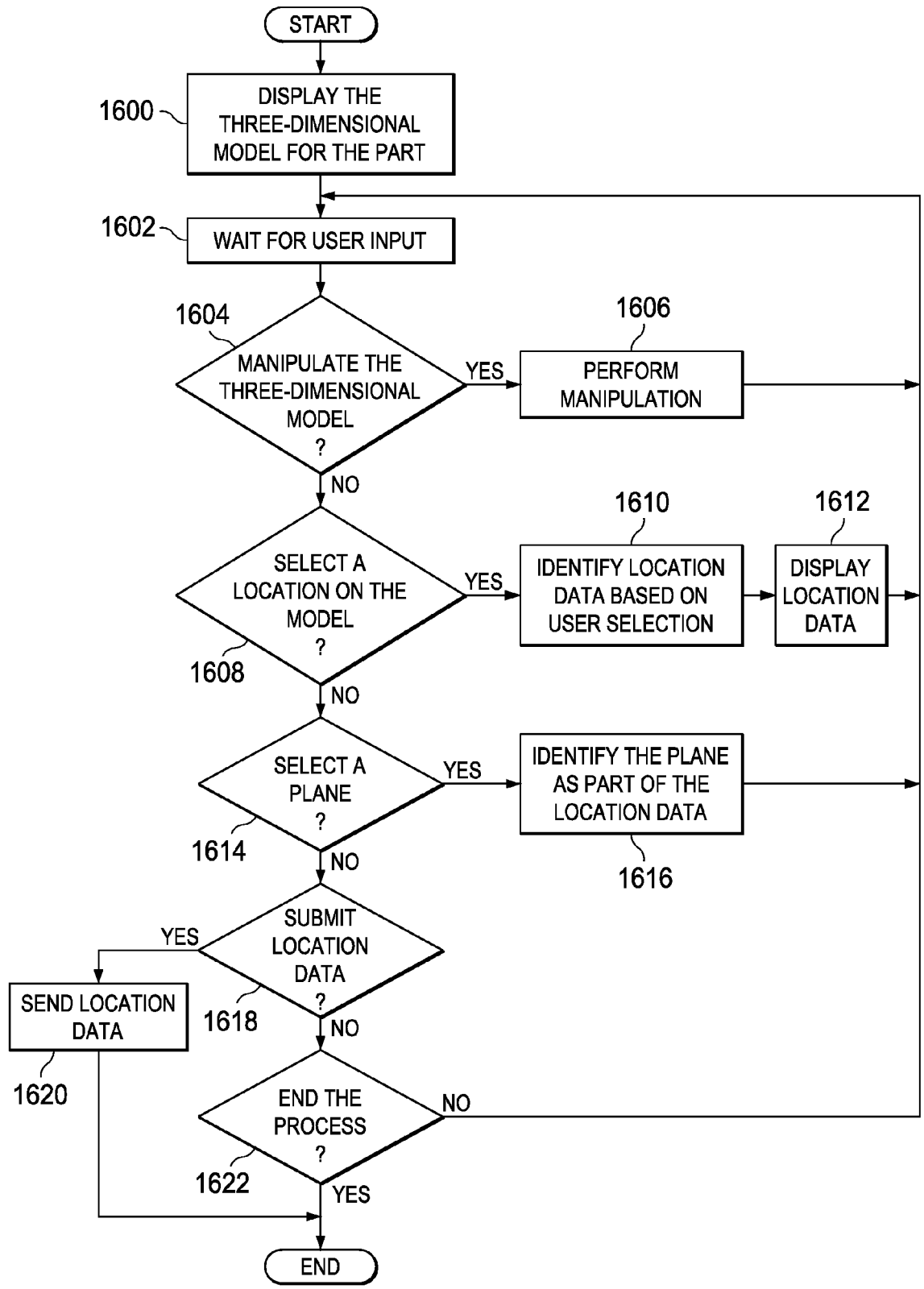
FIG. 16 is an illustration of a flowchart of a process for selecting a location on a part in accordance with an advantageous embodiment.

Turning now to FIG. 16, an illustration of a flowchart of a process for selecting a location on a part is depicted in accordance with an advantageous embodiment. The process illustrated in FIG. 16 may be implemented in client application 608 in FIG. 6.

The process begins by displaying the three-dimensional model for the part (operation 1600). The process then waits for user input (operation 1602). This user input may take various forms, such as, for example, without limitation, manipulating the model, selecting a location on the model, and/or submitting the location information to obtain ply layup data.

A determination is made as to whether the user input is to manipulate the three-dimensional model (operation 1604). If the user input is to manipulate the three-dimensional model, the manipulation is performed (operation 1606), with the process returning to operation 1602. In operation 1606, the user input may be for various actions, such as, for example, rotating the object, zooming, or panning.

In operation 1604, if the user input is not to manipulate the model, a determination is made as to whether the user input selects a location on the model (operation 1608). If the user input selects a location, the location data is identified based on the user selection (operation 1610). In identifying location data in operation 1610, coordinates for the location selected in the user input are identified. These coordinates may be for a coordinate system for the part.

The location data is displayed (operation 1612), with the process then returning to operation 1602 as described above. This location data may be, for example, in the form of X, Y, and Z coordinates. Additionally, the location may be graphically indicated on the three-dimensional model of the part.

With reference again to operation 1608, if the user input does not select a location on the model, a determination is made as to whether the user input is to select a plane (operation 1614). If the user input selects a plane, the plane is identified as part of the location data (operation 1616), with the process returning to operation 1602 as described above.

With reference again to operation 1614, if the user input does not select a plane, a determination is made as to whether the user input is to submit location data (operation 1618). In these examples, the location data includes the location and the plane that has been selected by the user input. If the user input is to submit location data, the location data is sent (operation 1620), with the process terminating thereafter. In these examples, the location data may be sent to another application, such as, for example, client application 608 or data extraction tool 612 in FIG. 6.

Turning back to operation 1618, if the user input is not a submission of the location data, a determination is made as to whether the user input is to end the process (operation 1622). If the user input is to end the process, the process terminates. Otherwise, the process returns to operation 1602 to wait for additional user input. In this instance, the user input is some input not handled by the process illustrated in this figure.

Figure 17:
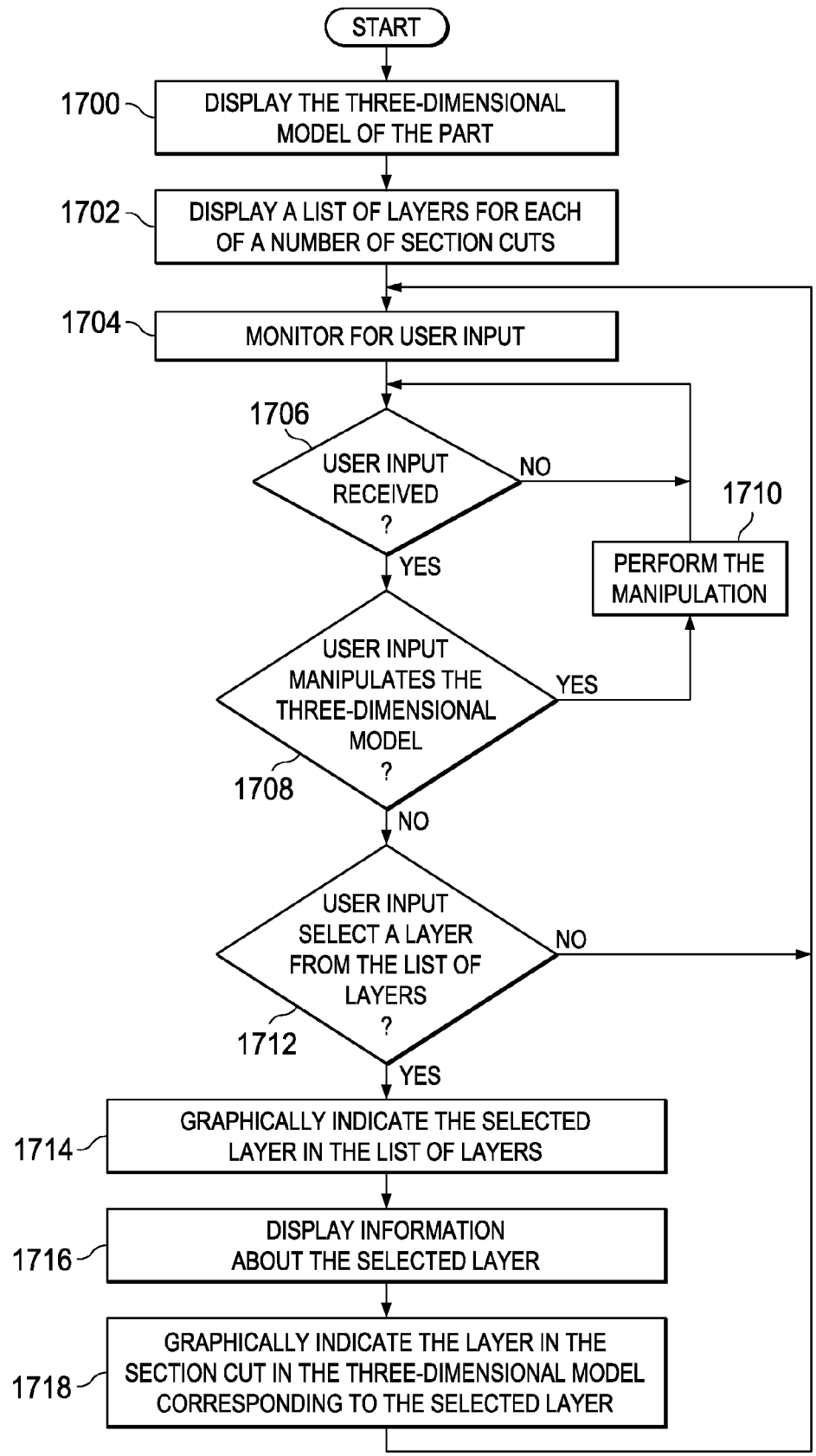
FIG. 17 is an illustration of a flowchart of a process for displaying information about a part in accordance with an advantageous embodiment.

Turning now to FIG. 17, a flowchart of a process for displaying information about a part is depicted in accordance with an advantageous embodiment. The process illustrated in FIG. 17 may be implemented in client application 608 in FIG. 6. This process may be initiated when response 646 is received by client application 608 in FIG. 6.

The process begins by displaying the three-dimensional model of the part (operation 1700). Operation 1700 may be performed using the formatted model of the part returned in a response. Thereafter, the process displays a list of layers for each of a number of section cuts (operation 1702). Operation 1702 may be formed using data for the layers in the response. In these examples, the data may be in an extensible markup language (XML) format.

Next, the process monitors for user input (operation 1704). A determination is made as to whether user input has been received (operation 1706). If user input has not been received, the process returns to operation 1706.

Otherwise, a determination is made as to whether the user input manipulates the three-dimensional model (operation 1708). This manipulation may be, for example, rotating the object, resizing the object, annotating the object, or some other suitable operation. If the user input manipulates the model, the process performs the manipulation (operation 1710), with the process returning to process 1706.

With reference again to operation 1708, if the user input does not manipulate the model, a determination is made as to whether the user input selects a layer from the list of layers (operation 1712). If the user input selects a layer from the list of layers, the process graphically indicates the selected layer in the list of layers (operation 1714). Thereafter, the process displays information about the selected layer (operation 1716). The process also graphically indicates the layer in the section cut in the three-dimensional model corresponding to the selected layer (operation 1718), with the process returning to operation 1704, as described above. In these illustrative examples, the graphical indication may be, for example, highlighting the selected layers, flashing the selected layers, changing the color of the selected layers, and/or other suitable indications.

Turning back to operation 1712, if the user input does not select a layer from the list of layers, the process does not perform any operations with respect to the presentation of the response. The process then returns to operation 1704.

Figure 18A:
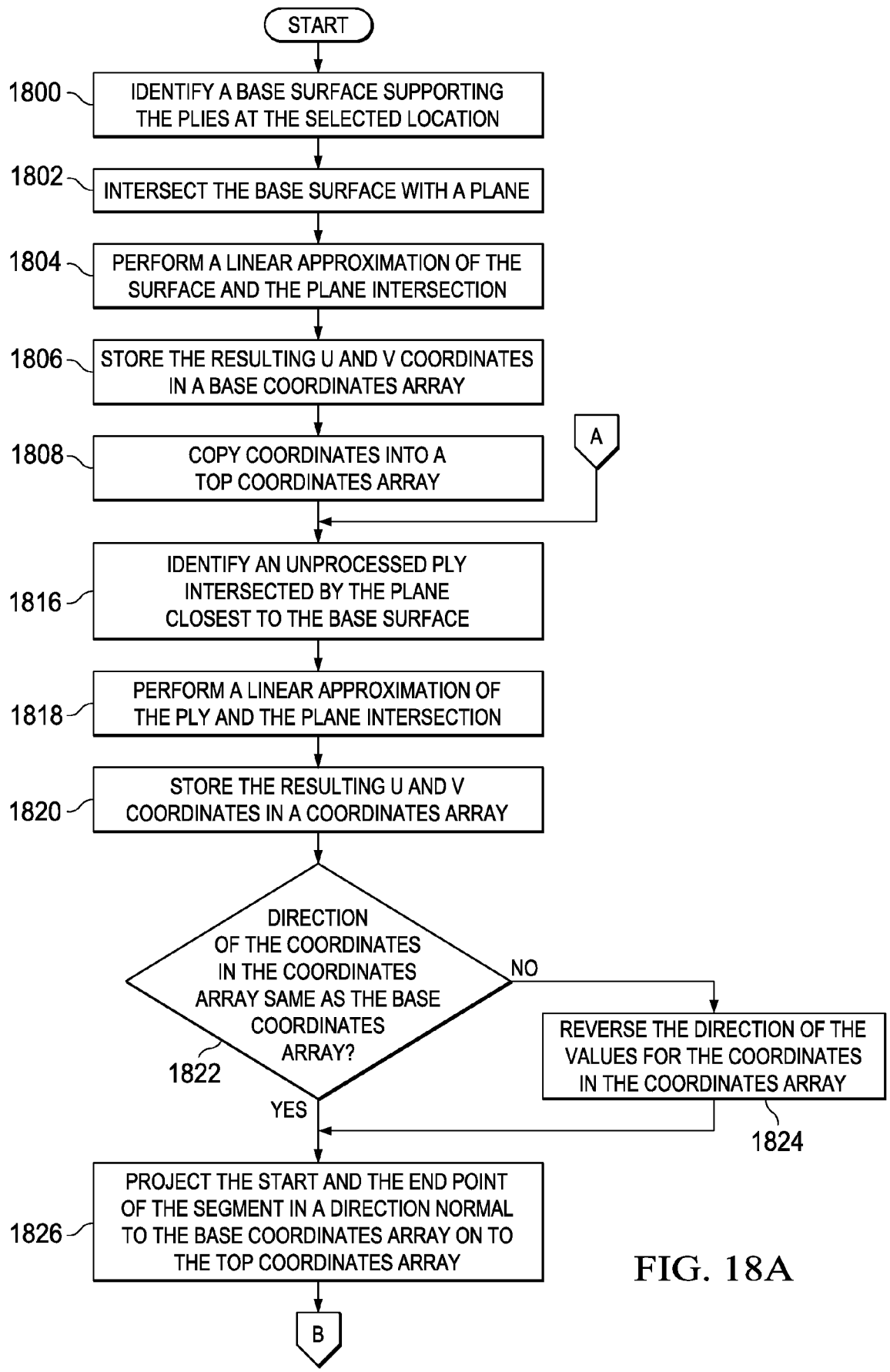
FIGS. 18A and 18B are illustrations of a flowchart of a process for creating section cuts in accordance with an advantageous embodiment.
Figure 18B:
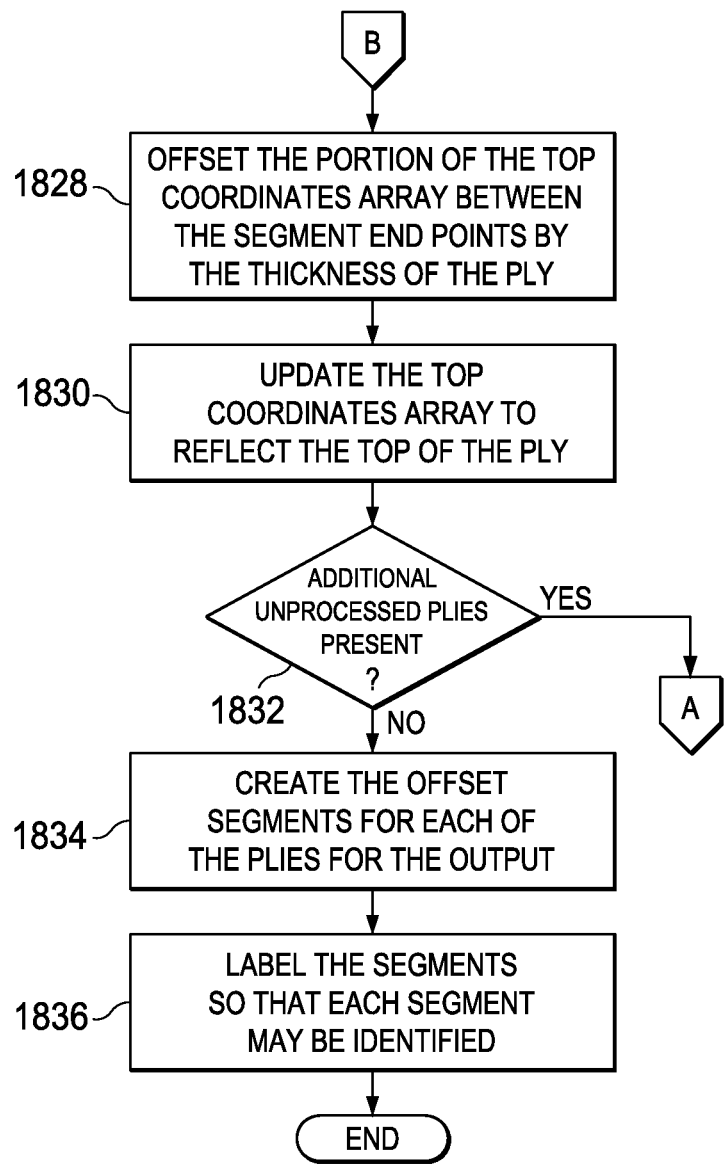

Turning now to FIGS. 18A and 18B, an illustration of a flowchart of a process for creating section cuts is depicted in accordance with an advantageous embodiment. The process in FIGS. 18A and 18B may be implemented in a software component such as, for example, data extraction tool 700 in FIG. 7. The process in FIGS. 18A and 18B is an example of a process that may be used to generate ply layup data as described with respect to display 1100 in FIG. 11.

The process begins by identifying a base surface supporting the plies at the selected location (operation 1800). In these examples, the base surface is the surface that supports the plies. Next, the base surface is intersected with a plane (operation 1802). This intersection generates intersections between the plane and the plies. In these examples, the plane may be, for example, plane 626 in FIG. 6. A linear approximation of the base surface and the plane intersection is performed (operation 1804).

The resulting U and V coordinates are stored in a base coordinates array (operation 1806). The result of operation 1806 is a series of points with X, Y, and Z coordinates. The points are all on the plane, which has its own U and V coordinate system. The point on the plane has U and V coordinates relative to the plane origin.

These coordinates are copied into a top coordinates array (operation 1808). At this point, the base coordinates array and the top coordinates array have the same values. As processing of the different plies in the section occur, the top coordinates array is updated. The final resulting values for the top coordinates array is the top surface of the upper most ply in the section.

Thereafter, an unprocessed ply intersected by the plane closest to the base surface is identified (operation 1816). A linear approximation of the ply and the plane intersection is performed (operation 1818). The resulting U and V coordinates are stored in a coordinates array (operation 1820).

Next, a determination is made as to whether the direction of the coordinates in the coordinates array is the same as the direction of the coordinates in the base coordinates array (operation 1822). If the coordinates are not in the same direction, the direction of the values for the coordinates in the coordinates array is reversed to match the same direction as the base coordinates array (operation 1824).

When the ply and the plane intersection is performed, the result is one or more curves. These curves have inherent start and end points used by the process. The process projects the start and end points of the segment in a direction normal to the base coordinates array on to the top coordinates array (operation 1826). The process proceeds directly to this operation from operation 1822 if the direction of the coordinates in the coordinates array and the base coordinates array are the same.

The process offsets the portion of the top coordinates array between the segment end points by the thickness of the ply (operation 1828). Operation 1828 changes the values in the top coordinates array to reflect the top of the ply that is being processed. The offset represents the plies' actual position in space. The process then updates the top coordinates array to reflect the top of the ply (operation 1830).

The end points of the ply and the plane intersection curve are projected onto the line segments defined in the top coordinates array, defining the bottom of the ply. The segments between the end points are offset by the scaled thickness, defining the top of the ply. Next, a determination is made as to whether additional unprocessed plies are present (operation 1832). If additional plies are present, the process returns to operation 1816, as described above, to identify an unprocessed ply intersected by the plane closest to the base surface.

If additional unprocessed plies are not present, the process draws or creates the offset segments for each of the plies for the output (operation 1834). These offset segments for the plies are used in a two-dimensional model to identify the ply stacking sequence. The process labels the segments so that each segment may be identified (operation 1836), with the process terminating thereafter.

In these examples, operations 1800-1826 may be implemented in a unit such as, for example, core identification unit 702 within data extraction tool 700 in FIG. 7. Operations 1828 and 1830 may be implemented in a unit such as, for example, core sampling unit 706 in FIG. 7. Operations 1834 and 1836 may be implemented in a unit, such as output generation unit 708 in FIG. 7.

In these examples, the planes are created perpendicular to the X vector and the Y vector. These planes may have various spacing. For example, the X planes may range from X=−18 to X=+18, and the Y planes may range from Y=−18 to Y=+18, with respect to the damage location. The range of the planes may be smaller if the part does not extend as far as the plane for the selected value. With the selected plane, a number of cuts are created. These different cuts are based on the length and width of the part. The cuts, however, in these examples, have a default value that is not less than three inches. The actual spacing may be adjusted such that all of the cuts are the same distance apart. Of course, other default values may be used, depending on the particular implementation.

As an example, if the damage location is 16 inches from the edge of the part, the range of the cuts in the X direction would be from −16 to +18 for a total of 34 inches. If the spacing is specified as six inches, it is adjusted to 5.667, so the cuts are taken at the following X values: −16, −10.333, −4.667, 1, 6.667, 12.333, and 18. As another example, if the part is 14 inches wide, the damage is in the center of the part, and a spacing of three inches is requested, the spacing may be adjusted to provide cuts that are 2.8 inches apart. These cuts may be at X values as follows: −7, −4.2, −1.4, 1.4, 4.2, and 7.7.

The flowcharts and block diagrams in the different depicted embodiments illustrate the architecture, functionality, and operation of some possible implementations of apparatus, methods and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for processing a model of a part. In response to receiving a request from a client application for information about a number of locations on the part, the number of locations is identified in the model of the part. A section cut is created at each of the locations in the model of the part to perform a number of section cuts. Data is obtained for a number of layers in each of the number of section cuts. The model with the number of section cuts is changed to form a formatted model with a format used by the client application to display the formatted model. The number of layers in each of the number of section cuts in the formatted model is associated with data in each of the layers in each of the number of section cuts to form an association between the formatted model and the data. The formatted model and the data are returned in a response to the client application.

In the illustrative examples, the formatted model may exclude unnecessary information needed for maintenance operations. Additionally, the formatted model also may exclude information that may be considered confidential or trade secret. Further, the formatted model and the data may be presented without requiring the user or operator to have a computer-aided design program. The formatted model and the data may be presented in a web browser using a viewer configured to display the formatted model.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art.

For example, although the different advantageous embodiments have been described with respect to aircraft, the different advantageous embodiments also recognize that some advantageous embodiments may be applied to other types of platforms. The platforms may be any platform for which information is needed about layers within the platform. The information may be used in the maintenance, reworking of parts, testing of parts, and other suitable purposes. The platform may be, for example, without limitation, a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing a model of a part, the method comprising:
   responsive to receiving a request from a client application for information about a number of locations on the part, identifying with a processor the number of locations in the model of the part, the model of the part stored on a non-transitory computer readable storage medium that is in communication with the processor;
   creating, using the processor, a section cut at each of the number of locations in the model of the part to form a number of section cuts;
   obtaining, using the processor, data for a number of layers in each of the number of section cuts;
   changing, using the processor, the model with the number of section cuts to form a formatted model with a format used by the client application to display the formatted model;
   associating, using the processor, the number of layers in the each of the number of section cuts in the formatted model with the data for the number of layers in the each of the number of section cuts to form an association between the formatted model and the data, wherein associating includes creating metadata correlating the data for the number of layers for the each of the number of section cuts with layers for the each of the number of section cuts in the formatted model;
   returning, using the processor, the formatted model and the data for the number of layers in a response to the client application, wherein the metadata is included in the response, wherein the data for the number of layers and the metadata are returned in a web page having program code configured to make calls to a viewer to indicate a corresponding layer in the formatted model in response to a selection of the data for the number of layers in the web page, and further wherein the metadata includes identification of calls that may be made to a viewer presenting the formatted model.

2. The method of claim 1 further comprising:
   identifying corresponding planes for the number of section cuts.

3. The method of claim 1, wherein the data is formatted in an extensible markup language format.

4. The method of claim 1, wherein the client application comprises a web browser.

5. The method of claim 4, wherein the client application further comprises a plug-in for the web browser configured to present the formatted model.

6. The method of claim 1, wherein the client application comprises a viewer for computer-aided design files.

7. The method of claim 1, wherein the part is a composite part and the number of layers is a number of plies in a composite part.

8. The method of claim 7, wherein the composite part is for an aircraft.

9. An apparatus comprising:
   a bus;
   a memory connected to the bus, wherein program code is stored in the memory;
   a processor unit configured to run the program code to identify a number of locations in a model of a part in response to receiving a request from a client application for information about the number of locations on the part; create a section cut at each of the number of locations in the model of the part to form a number of section cuts; obtain data for a number of layers in each of the number of section cuts; change the model with the number of section cuts to form a formatted model with a format used by the client application to display the formatted model; associate the number of layers in the each of the number of section cuts in the formatted model with the data for the number of layers in the each of the number of section cuts to form an association between the formatted model and the data; and return the formatted model and the data for the number of layers in a response to the client application, wherein to associate the number of layers includes creating metadata correlating the data for the number of layers for the each of the number of section cuts with layers for the each of the number of section cuts in the formatted model, wherein the metadata is included in the response, wherein the program code is further configured to return the data for the number of layers and the metadata in a web page having program code configured to make calls to a viewer to indicate a corresponding layer in the formatted model in response to a selection of the data for the number of layers in the web page, and further wherein the metadata includes identification of calls that may be made to a viewer presenting the formatted model.

10. The apparatus of claim 9, wherein the processor unit is configured to run the program code to identify corresponding planes for the number of section cuts for the number of layers.

11. The apparatus of claim 9, wherein the data is formatted in an extensible markup language format.

12. The apparatus of claim 9, wherein the client application comprises a web browser.

13. The apparatus of claim 12, wherein the client application further comprises a plug-in for the web browser configured to present the formatted model.

14. The apparatus of claim 9, wherein the client application comprises a viewer for computer-aided design files.

15. The apparatus of claim 9, wherein the part is a composite part and the number of layers is a number of plies in the composite part.

16. The apparatus of claim 15, wherein the composite part is for an aircraft.

17. A non-transitory computer readable storage medium storing program code comprising:
program code for, responsive to receiving a request from a client application for information about a number of locations on a part, identifying the number of locations in a model of the part;
program code for creating a section cut at each of the number of locations in the model of the part to form a number of section cuts;
program code for obtaining data for a number of layers in each of the number of section cuts;
program code for changing the model with the number of section cuts to form a formatted model with a format used by the client application to display the formatted model;
program code for associating the number of layers in the each of the number of section cuts in the formatted model with the data for the number of layers in the each of the number of section cuts to form an association between the formatted model and the data, wherein the program code for associating includes program code for creating metadata correlating the data for the number of layers for the each of the number of section cuts with layers for the each of the number of section cuts in the formatted model; and
program code for returning the formatted model and the data for the number of layers in a response to the client application, wherein the program code for returning further includes program code for including the metadata in the response, wherein the program code for returning is further configured to return data for the number of layers and the metadata in a web page having program code configured to make calls to a viewer to indicate a corresponding layer in the formatted model in response to a selection of the data for the number of layers in the web page, and further wherein the metadata includes identification of calls that may be made to a viewer presenting the formatted model.

18. The non-transitory computer readable storage medium of claim 17 further comprising:
program code for identifying corresponding planes for the number of section cuts.

19. The non-transitory computer readable storage medium of claim 17, wherein the program code for associating the number of layers in the each of the number of section cuts in the formatted model with the data for the number of layers in the each of the number of section cuts to form the association between the formatted model and the data comprises:
program code for creating metadata correlating the data for the number of layers for the each of the number of section cuts with the layers for the each of the number of section cuts in the formatted model in which the metadata is included in the response.

* * * * *